(12) United States Patent
Golshan et al.

(10) Patent No.: US 12,356,280 B2
(45) Date of Patent: *Jul. 8, 2025

(54) TECHNIQUES FOR SYNCHRONIZING ULTRA-WIDE BAND COMMUNICATIONS

(71) Applicant: APPLE INC., Cupertino, CA (US)

(72) Inventors: Robert Golshan, San Francisco, CA (US); Adwait N. Dongare, Berkeley, CA (US); Robert W. Brumley, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 17/647,822

(22) Filed: Jan. 12, 2022

(65) Prior Publication Data

US 2023/0062363 A1 Mar. 2, 2023

Related U.S. Application Data

(60) Provisional application No. 63/239,240, filed on Aug. 31, 2021.

(51) Int. Cl.
*H04W 4/02* (2018.01)
*H04W 72/12* (2023.01)

(52) U.S. Cl.
CPC ......... *H04W 4/023* (2013.01); *H04W 72/12* (2013.01)

(58) Field of Classification Search
CPC ....... H04W 4/023; H04W 72/12; H04W 4/06; H04W 4/80; G01S 5/08; G01S 13/765
See application file for complete search history.

(56) References Cited

U.S. PATENT DOCUMENTS

| | | | | |
|---|---|---|---|---|
| 7,184,413 | B2* | 2/2007 | Beyer | H04W 72/20 370/254 |
| 7,778,640 | B2* | 8/2010 | Cho | H04W 60/06 455/435.2 |
| 8,005,465 | B2* | 8/2011 | Salokannel | H04W 4/80 455/414.3 |
| 9,439,039 | B1 | 9/2016 | Patil et al. | |
| 9,974,040 | B1* | 5/2018 | Chu | H04L 67/1042 |
| 10,264,544 | B1* | 4/2019 | Chu | H04L 5/0048 |

(Continued)

*Primary Examiner* — Yuwen Pan
*Assistant Examiner* — Swati Jain
(74) *Attorney, Agent, or Firm* — Kilpatrick Townsend & Stockton LLP

(57) ABSTRACT

Techniques for ranging for a mobile device with one or more electronic devices using communication circuitry implementing a wireless protocol can include storing a schedule for a plurality of communication sessions. The technique can include broadcasting the advertising packets during a selected number of available time slots of a second time period, the advertising packets including information about the schedule for the plurality of communication sessions. After broadcasting an advertising packet during a selected time slot, the technique can include entering a reduced power state for the communication circuitry until a subsequent advertising packet is sent or a subsequent first time period for communicating the ranging packets as specified by the schedule. The technique can include exiting the reduced power state for the communication circuitry prior to the subsequent first time period. The technique can include transmitting a ranging packet via the wireless protocol according to the schedule.

20 Claims, 13 Drawing Sheets

(56) References Cited

U.S. PATENT DOCUMENTS

| | | | |
|---|---|---|---|
| 10,771,999 B2* | 9/2020 | Sanderovich | H04W 64/00 |
| 11,552,705 B2* | 1/2023 | Van Wageningen | H04B 10/27 |
| 11,564,057 B2* | 1/2023 | Barton | G01S 5/0236 |
| 11,582,638 B2* | 2/2023 | Goyal | H04W 28/04 |
| 11,812,334 B2* | 11/2023 | Henry | H04W 74/0825 |
| 11,828,832 B2* | 11/2023 | Henry | H04W 4/80 |
| 11,832,256 B2* | 11/2023 | Lee | H04B 1/7163 |
| 11,892,538 B2* | 2/2024 | Kim | H04B 1/7163 |
| 2010/0290375 A1* | 11/2010 | Chin | H04W 36/0064 370/281 |
| 2012/0172035 A1* | 7/2012 | Parekh | H04W 36/0085 455/426.1 |
| 2014/0357194 A1* | 12/2014 | Jin | H04L 43/0847 455/41.2 |
| 2017/0048904 A1* | 2/2017 | Monaghan | H04B 7/15507 |
| 2017/0070847 A1* | 3/2017 | Altman | H04W 4/80 |
| 2017/0086204 A1* | 3/2017 | Jung | H04W 28/0263 |
| 2018/0035449 A1* | 2/2018 | Liu | H04W 76/10 |
| 2018/0048742 A1* | 2/2018 | Venkatesan | H04W 4/02 |
| 2018/0242270 A1* | 8/2018 | Zhang | G01S 11/02 |
| 2019/0124654 A1 | 4/2019 | Cherian et al. | |
| 2019/0208470 A1* | 7/2019 | Asterjadhi | H04W 52/0229 |
| 2019/0306825 A1* | 10/2019 | Lindskog | H04W 24/10 |
| 2019/0394748 A1* | 12/2019 | Al-kadi | H04W 4/80 |
| 2020/0068520 A1* | 2/2020 | Marri Sridhar | H04W 8/005 |
| 2020/0106877 A1* | 4/2020 | Ledvina | H04L 9/30 |
| 2020/0196323 A1* | 6/2020 | Church | H04W 4/80 |
| 2020/0366335 A1* | 11/2020 | Lee | H04W 88/06 |
| 2021/0211858 A1* | 7/2021 | Ellenbeck | H04W 72/0466 |
| 2022/0210631 A1* | 6/2022 | Lee | H04B 1/69 |
| 2022/0279324 A1* | 9/2022 | Mourad | H04L 1/203 |
| 2022/0397658 A1* | 12/2022 | Ha | G01S 7/006 |
| 2022/0397659 A1* | 12/2022 | Ha | H04W 8/005 |
| 2024/0147367 A1* | 5/2024 | Bauwens | H04W 52/0229 |

\* cited by examiner

TECHNIQUES FOR SYNCHRONIZING ULTRA-WIDE BAND COMMUNICATIONS

CROSS-REFERENCES TO RELATED APPLICATIONS

This application claims the benefit to U.S. Provisional Application No. 63/239,240, filed Aug. 31, 2021 entitled "TECHNIQUES FOR SYNCHRONIZING ULTRA-WIDE BAND COMMUNICATIONS," the disclosures which is incorporated by reference in its entirety.

BACKGROUND

Electronic devices are capable of exchanging information via different communication paths. Determining range(s) and angle of arrival of received signals can be used by applications on electronic devices to enable targeted communication between devices. Beacons can transmit information that can be received by one or more mobile devices. The mobile devices can use the angle of arrival and/or range to identity beacons or other electronic devices.

Information exchange techniques can be limited on the number of participating devices due to collision between information packet exchanges using a wireless protocol. Scheduling techniques can assign specific time periods to respective participating devices to minimize packet collisions and account for devices entering and leaving the packet exchanges, but such techniques have certain disadvantages. In addition, maintaining the device in a powered-on state until the next transmission of either the advertising signal or the ranging signal can drain the battery of the device. Further, synchronizing time periods on two devices in combination with the ranging can cause excessive coordination among different protocols within a device.

BRIEF SUMMARY

Techniques for ranging for a mobile device with one or more electronic devices using communication circuitry implementing a wireless protocol can include storing a schedule for a plurality of communication sessions. Only one wireless protocol may be used. Advertising packets of the wireless protocol can be broadcasted during a selected number of available time slots of a first time period. The advertising packets can include information about the schedule for the plurality of communication sessions. After broadcasting an advertising packet during a selected time slot, the communication circuitry can enter a reduced power state until a subsequent advertising packet is sent or a subsequent first time period for communicating the ranging packets as specified by the schedule. The communication circuitry can exit the reduced power state for the communication circuitry prior to the subsequent first time period. A ranging packet can then be transmitted via the wireless protocol according to the schedule.

These and other embodiments of the disclosure are described in detail below. For example, other embodiments are directed to systems, devices, and computer-readable media associated with methods described herein.

A better understanding of the nature and advantages of embodiments of the present disclosure may be gained with reference to the following detailed description and the accompanying drawings.

BRIEF DESCRIPTION OF THE DRAWINGS

Like reference symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
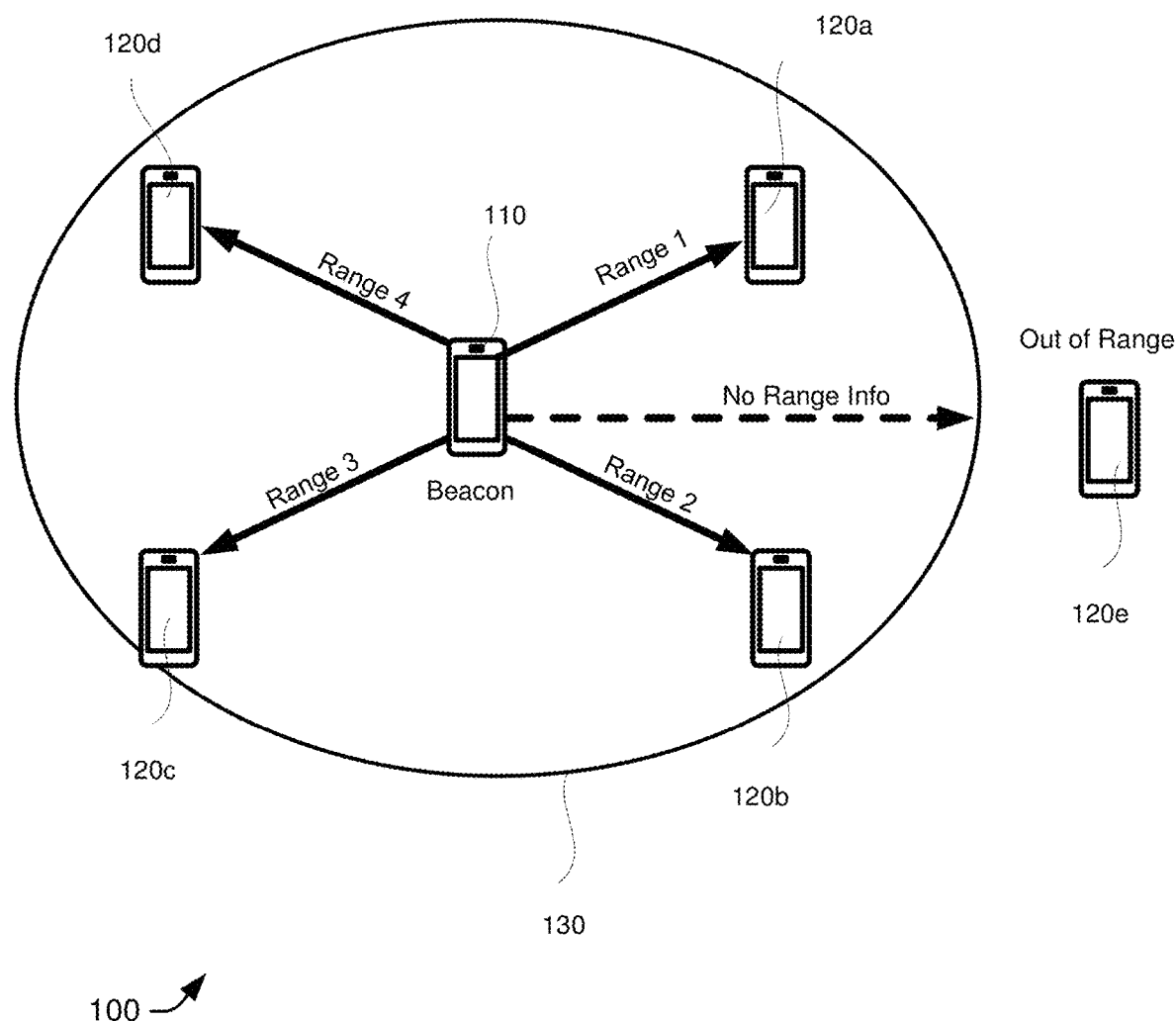
FIG. 1 illustrates schematically an example of one-to-many ranging techniques involving a primary device and multiple secondary devices.

Other approaches utilize a Bluetooth signal (e.g., Bluetooth low energy (BLE)) for both discovery and synchronization of the ranging signals. It would be advantageous to develop techniques for either discovery or synchronization for Ultra-Wide Bandwidth (UWB) ranging that is decoupled from the use of Bluetooth (as Bluetooth is older technology). However, to have UWB devices continuously scanning can be a power intensive operation. The following techniques can mitigate the power consumption for UWB only ranging (e.g., without the use of BT signals).

Techniques for ranging for a mobile device with one or more electronic devices using communication circuitry implementing a wireless protocol can include storing a schedule for a plurality of communication sessions. The schedule can provide information on the transmission of UWB poll messages for ranging sessions. The information can be a delay time from the transmission time of the UAP that can be used by responding devices for synchronization. Only one wireless protocol may be used. Advertising packets of the wireless protocol can be broadcast during a selected number of available time slots of a first time period.

The advertising packets can include information about the schedule for the plurality of communication sessions. In this manner, the collisions between UWB packets for ranging and UWB packets for advertising messages can be reduced. After broadcasting an advertising packet during a selected time slot, the communication circuitry can enter a reduced power state until a subsequent advertising packet is sent or a subsequent first time period for communicating the ranging packets as specified by the schedule. The communication circuitry can exit the reduced power state for the communication circuitry prior to the subsequent first time period. A ranging packet can then be transmitted via the wireless protocol according to the schedule.

For one-to-many ranging operations, a UWB only technique can include simultaneously supporting ranging and advertising for synchronization using the UWB signals. This technique can utilize UWB advertising that no longer ties transmission of UAPs (UWB acquisition packets) to BLE advertisements. Instead of using BLE advertisements for timing of the UAPs, this technique defines time periods for ranging and advertising periods. The starting time of the next ranging session can be communicated to the other devices during the advertising period. This allows the UWB processor to autonomously manage UAP scheduling without host-layer intervention. Using this technique, UAPs can be sent during defined advertising windows. This approach avoids scheduling conflicts with poll packet transmissions. This approach can use a unique preamble or a different radio frequency (RF) channel for advertising than for ranging. The UAP may include a scrambling training sequence (STS) data packet. In various embodiments, the mobile device may receive and process the STS and determine that the packet is not for that mobile device. In various embodiments, the mobile device may use multiple preambles (e.g., four preambles). Within each advertising window, the electronic device can select randomly $N_A$ of $N_S$ time slots for UAP transmission.

I. One-to-Many Scenario

The disclosed techniques allow for ranging of multiple devices using a single primary device. The primary device can be a beacon device or other mobile device. As examples, the beacon device can comprise a smartphone, a tablet, a wearable device, a laptop, or a portable electronic device.

FIG. 1 illustrates a one-to-many communication group 100 involving a primary device (referred to as a beacon) 110 and multiple secondary devices 120a-120e. The primary device 110 may send signals to the secondary devices 120a-120e to facilitate communication ranging sessions. Global navigation satellite systems (GNSS) signals, such as the global positioning system (GPS) signals, can be an important aspect of device-to-device (D2D) communications, as it may be important for the secondary devices 120 to know the exact location of the primary device 110 and the exact time when the primary device 110 broadcasts a message. For example, in case of an emergency, the primary device 110 may broadcast an emergency message to all secondary devices 120 within a communication range of the primary device 110 (e.g., within the circle 130 around the primary device 110; note that the secondary device 120e may be out of the communication range of the primary device 110 as it may be too far from the primary device 110).

A secondary device 120 receiving the emergency message may need to know the location of the primary device 110 in order to provide help. The secondary device 120 may also need to know the time when the emergency message was sent, e.g., in order to determine whether the emergency message is still relevant, to determine whether the transmitting device may have moved, etc. The position information and timing information can be important in other situations. The primary device 110 may maintain position fixes (e.g., in terms of longitude and latitude) and time through satellite signals. The secondary devices may not have position fixes directly through satellite signals.

The communications between the devices can be implemented using frames. A frame can refer to a digital data transmission unit in computer networking and telecommunication. A frame typically includes one or more frame synchronization features comprising a sequence of bits or symbols that indicate to the receiver the beginning and end of the payload data within the stream of symbols or bits it receives.

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology. Ranging techniques between multiple devices can be challenging due to scheduling the transmission of ranging request messages, response messages, and acknowledgement messages on the same channel so that collisions between these messages are minimized or avoided. These techniques can be better understood with a brief explanation of ranging techniques for mobile device.

II. Ranging

In some embodiments, a mobile device can include circuitry for performing ranging measurements. Such circuitry can include one or more dedicated antennas (e.g., three antennas) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

Figure 2:
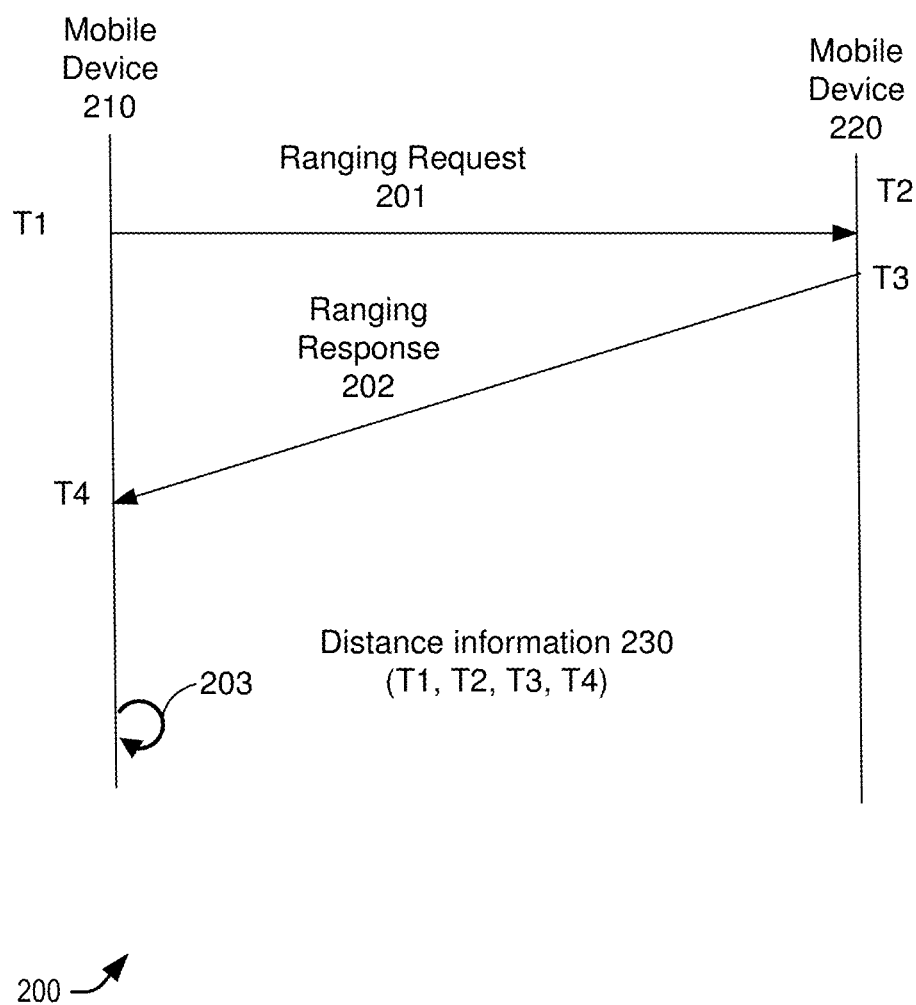
FIG. 2 illustrates a sequence diagram for performing a ranging measurement between two mobile devices according to embodiments of the present disclosure.

FIG. 2 shows a sequence diagram 200 for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 2 shows a single measurement, the process can be repeated to perform multiple measurements over a time interval as part of a ranging session, where such measurements can be averaged or otherwise analyzed to provide a single distance value, e.g., for each antenna.

A first mobile device 210 (e.g., a smartphone) can initiate a ranging measurement (operation) by transmitting a ranging request 201 to a second mobile device 220. Ranging request 201 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, the first mobile device 210 transmits ranging request 201. At T2, the second mobile device 220 receives ranging request 201. T2 can be an average received time when multiple pulses are in the first set. The second mobile device 220 can be expecting the ranging request 201 within a time window based on previous communications, e.g., using another wireless protocol. The ranging wireless protocol and the another wireless protocol can be synchronized so that mobile device 220 can turn on the ranging antenna(s) and associated circuitry for a specified time window, as opposed to leaving them on for an entire ranging session.

In response to receiving the ranging request 201, mobile device 220 can transmit ranging response 202. As shown, ranging response 202 is transmitted at time T3. In the case of a single pulse ranging response 202, time T3 can represent the transmitted time of the pulse. In the case of multiple ranging responses 202, time T3 can represent an average transmission time for a set of pulses. T2 and T3 may also be a set of times for respective pulses. Ranging response 202 can include times T2 and T3 so that mobile device 210 can compute distance information. As an alternative, a delta between the two times (e.g., T3-T2) can be sent. The ranging response 202 can also include an identifier for the first mobile device 210, an identifier for the second mobile device 220, or both.

At T4, the first mobile device 210 can receive ranging response 202. Like the other times, T4 can be a single time value or a set of time values.

At 203, the first mobile device 210 computes distance information 230, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2−T1+T4−T3. In some embodiments, the processing time for the second mobile device 220 can also be subtracted from the total round-trip time. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

Figure 3:
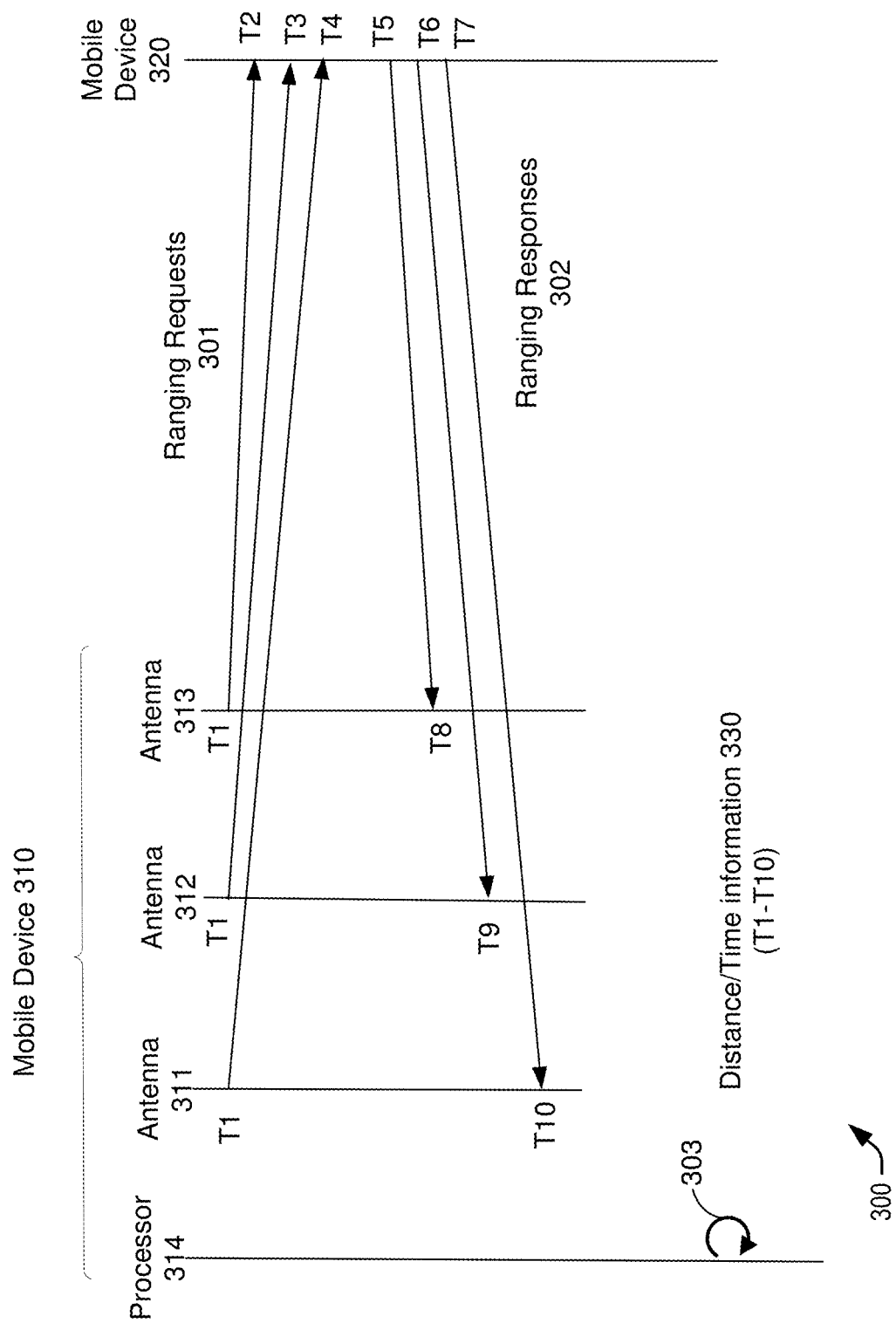
FIG. 3 illustrates a sequence diagram of a ranging operation involving a mobile device having multiple antennae according to embodiments of the present disclosure.

FIG. 3 shows a sequence diagram 300 of a ranging operation involving a mobile device 310 having three antennas 311, 312, and 313 according to embodiments of the present disclosure. Antennas 311, 312, 313 can be arranged to have different orientations, e.g., to define a field of view for performing ranging measurements.

In this example of FIG. 3, each of antennas 311, 312, 313 transmits a packet (including one or more pulses) that is received by mobile device 320. These packets can be part of ranging requests 301. The packets can each be transmitted at time T1, although they can be transmitted at different times in other implementations.

In some embodiments, mobile device 320 can have multiple antennas itself. In such an implementation, an antenna of mobile device 310 can send a packet to a particular antenna (as opposed to a broadcast) of mobile device 320, which can respond to that particular packet. Mobile device 320 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 301 are received at times T2, T3, and T4, respectively. Thus, the antenna(s) (e.g., UWB antennas) of mobile device 320 can listen at substantially the same time and respond independently. Mobile device 320 provides ranging responses 302, which are sent at times T5, T6, and T7, respectively. Mobile device 310 receives the ranging responses at times T8, T9, and T10, respectively.

At 303, processor 314 of mobile device 310 computes distance information 330, e.g., as described herein. Processor 314 can receive the times from the antennas and more specifically from circuitry (e.g., UWB circuitry or communication circuitry), that analyzes signals from antennas 311, 312, 313. As described later, processor 314 can be an always-on processor that uses less power than an application processor that can perform functionality that is more general. Distance information 330 can be used to determine a 2D or 3D position of mobile device 320, where such position can be used to configure a display screen of mobile device 310. For instance, the position can be used to determine where to display an icon corresponding to mobile device 320, e.g., which position in a list, which position in a 2D grid, or in which cluster of 1D, 2D, or 3D distance/position ranges to display the icon.

In some embodiments, to determine which ranging response is from which antenna, mobile device 320 can inform mobile device 310 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 301 and ranging responses 302 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over one millisecond). The packet frames in these messages can be about 150 to 180 microseconds long.

C. UWB

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 301 can correspond to stage 1 and ranging responses 302 can correspond to stage 2. Such use of an indicator may be helpful when more than two devices are performing ranging operations near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

III. Ultra-Wide Band Acquisition Packets (UAPS)

Ultra-Wide Band transmissions are not continuous transmissions, so a receiving device looking to acquire the UWB transmission (e.g., the UWB polling for a ranging session) would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the expected transmission time window. For UWB communications, it can be challenging to the receiving device to know when the first packet is going to arrive.

A technique to communicate the UWB transmission times for ranging is to broadcast the UWB schedule information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 MHz. Bluetooth defines two transmission types: data and advertising transmissions. As such, three of these 40 channels are dedicated to advertising and 37 dedicated to data. Advertising allows devices to broadcast information defining their intentions.

A UWB Acquisition Packet (UAP) can include a message transmitted over a UWB wireless protocol. The UAP cab include information regarding the next UWB poll message for a ranging session. In various embodiments, the UAP can include information such as time delay after the UAP transmission time until transmission of the next poll message for a ranging session. In various embodiments, the UAP can include information such as time delay after the BLE advertising signal until transmission of the next poll message for a ranging session. The UAPs can convey the time of the next UWB poll transmission, which is part of a ranging measurement. In various embodiments, the UAP can include information regarding the UWB poll message (e.g., a UWB preamble information). The UWB preamble information can be used by the receiving device to determine the purpose of the UWB message (e.g., an advertising message or a polling message). The UAP packet can also include information to identify the transmitting device (e.g., identifier for the broadcast device).

The packet containing the UWB schedule can be structured to occur at a specific time relative to the transmitting device's BLE advertisements. In various embodiments, the offset time can be hardcoded by the mobile devices. Accordingly, the receiving device can listen for the UAPs at an expected time after receiving an advertising signal or during an expected time window around the expected time. For example, ranging requests can be considered poll transmissions. The receiver device can use the time in the UAP to determine when to listen for the next poll. The UAPs can also be transmitted in the UWB frequency range. The technique can also anchor the UAP transmission timing to any other long time sequence such as Apple Wireless Direct Link (AWDL) protocol currently used for Airdrop features.

Figure 4:
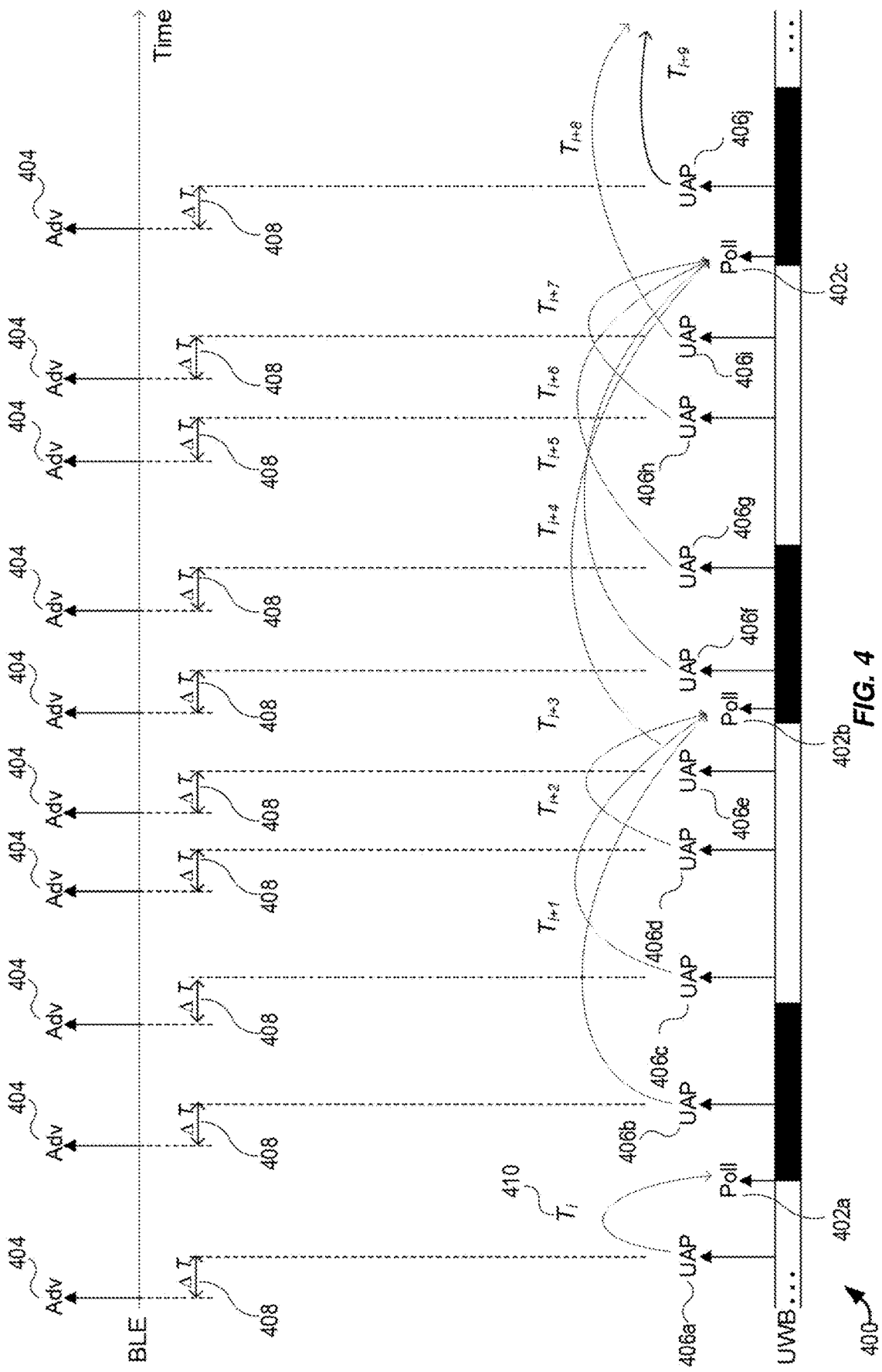
FIG. 4 illustrates an exemplary depiction of a timeline for using the Bluetooth advertisement signals to synchronize the timing for transmission of UAPs.

FIG. 4 illustrates an exemplary depiction of a timeline 400 for using the BLE advertisement signals to synchronize the timing for transmission of UAPs. FIG. 4 illustrates a timeline 400 for transmission of multiple signals (e.g., UWB signals and BLE signals) from a single device. A transmitter device can transmit a UWB poll 402 at regular intervals (e.g., every 100 milliseconds). The transmitter device can also transmit BLE advertisements 404 more frequently than the UWB poll 402 transmissions. For example, the BLE advertisements 404 can be transmitted approximately every 30 milliseconds. The BLE advertisements 404 can be transmitted irregularly to avoid collisions between data packets. Thus, BLE advertisements 404 can be transmitted at a predetermined interval (e.g., every 30 seconds) plus some random delay of 0 to 10 milliseconds. This provides random dithering between advertisements. The transmitter device can transmit a UAP message 406 at a fixed time interval (ΔT) 408 following the transmission of the BLE advertisement 404. The time interval (ΔT) 408 can be predetermined so the receiving device can know to listen for the UAP message 406 after a predetermined time after transmission of the BLE advertisement 404.

The transmitter device can calculate the time duration between the transmission of the UAP message 406 and the next UWB poll 402. For example, as shown in FIG. 4, the time (TO) is the time interval between the first UAP message 406*a* and the first UWB poll 402*a*. In some embodiments, the time interval can be around 200 microseconds. The UAP message 406*a* can include the time ($T_i$) information. A receiving device that captures the UAP message 406 can determine that the next UWB poll 402b will occur at a time interval $T_i$ 410 after receiving the UAP message 406, thereby synchronizing the clocks between the transmitting device and the receiving device.

FIG. 4 illustrates three UAP messages 406b-d between the first UWB poll 402a and the second UWB poll 402b. Each of the UAP messages 400b-d can include the time intervals (e.g., $T_{i+1}$, $T_{i+2}$, and $T_{i+3}$) until the second UWB poll 402b. Each of the time intervals ($T_{i+1}$, $T_{i+2}$, and $T_{i+3}$) would be different because the time until the next UWB poll 402b would decrease as time progresses. In some cases, such as for UAP message 406e, there is not enough time remaining prior to the next UWB poll 402b. In these cases, the UAP message 406e provides the time to the subsequent UWB poll 402c. This process can be repeated as necessary.

In a one-to-many ranging scenario, there can be multiple receiver devices, as described above. The UWB poll 402 can be the ranging request 201 as shown in FIG. 2. For example, in cases with one beacon device and three receiving devices in a ranging round, individual communications can be designated in certain time slots, and the UAP messages 406 can be transmitted during those time slots. If a new receiver device wants to join the ranging session, the new receiver device can determine the timing schedule for the next UWB poll 402b. In some embodiments, the single broadcast message for one-to-many can be the advertisement signal. The beacon device can transmit the UAP messages 406 providing the time information to the next UWB poll 402 (or the broadcast message) from the beacon. In this case, each receiving device that receives the UAP messages 406 can use the information to determine when to listen for the UWB poll 402. The UWB poll 402 can provide information on the time slots for the ranging round. Each receiving device would then determine which time slot the device is in and add an individual delay prior to responding.

In other embodiments, for each time slot there can be a different BLE advertisement signal 404 and different UAP messages 406 for that specific time slot to synchronize the timing between the transmitting device and the receiving device in the time slot.

IV. UWB Synchronization Techniques

The UWB synchronization techniques disclosed herein allow for ranging techniques without relying on other wireless protocols (e.g., Bluetooth) for synchronization. Using only a single protocol has advantages. For example, the UWB transceiver system is not knowledgeable about Bluetooth signals. The UWB transceiver does not know when Bluetooth advertisements either are sent or received, at both ends of the link. So if you are the initiating device, you are broadcasting to Bluetooth that timing information has to be passed down into the UWB transceiver chip at the host.

In various embodiments, the host layer tells the UWB transceiver chip that it just had a Bluetooth advertisement so the UWB transceiver will need to transmit a UAP packet, and that information for each UAP packet can be used for the individual scheduling based on the host again. By severing that connection, these techniques allow the UWB transceiver to autonomously control UAP transmissions without the host layer intervention. This allows the UWB transceiver to know that it just completed ranging here with those kinds of devices. A subset of slots can be reserved for advertising. For example, the UWB transceiver can randomly select 10 of the next 40 slots over the advertising period and send a UAP packet. A value can be included in the UAP that represents the time of transmission of that UAP packet relative to the beginning of the next ranging cycle. This can be accomplished internal to the UWB transceiver without coordination with other wireless protocols. UWB operations can be power intensive for mobile devices. Therefore, synchronization techniques have been developed to reduce the power consumption of UWB so the UWB receiver does not need to be on, continuously listening for signals. Therefore, UWB synchronization schedules can be developed to establish ranging and advertising periods to synchronize the various devices for ranging operations.

A. One-to-Many

With regard to one-to-many modes, a UWB-only technique can include simultaneously ranging and advertising using UWB. Techniques can utilize UWB advertising that no longer ties transmission of UAPs (UWB acquisition packets) to BLE advertisements. Instead of using BLE advertisements for timing of the UAPs, embodiments can define time periods for ranging and advertising periods. The starting time of a next ranging session can be communicated to the other devices during the advertising period. This allows the communication circuitry to autonomously manage UAP scheduling without host-layer intervention. Using this technique, UAPs can be sent during defined advertising windows. This approach avoids scheduling conflicts with poll packet transmissions. This approach can use a unique preamble or a different RF channel for advertising than for ranging. Within each advertising window, the electronic device can select randomly a first number of advertising slots ($N_A$) of a total number of time slots ($N_S$) possible for UAP transmission. For example, in various embodiments 4 slots can be used for ranging and 10 advertising slots ($N_A$) of a total of 29 potential advertising slots ($N_S$) can be selected for broadcasting advertising messages.

Figure 5A:
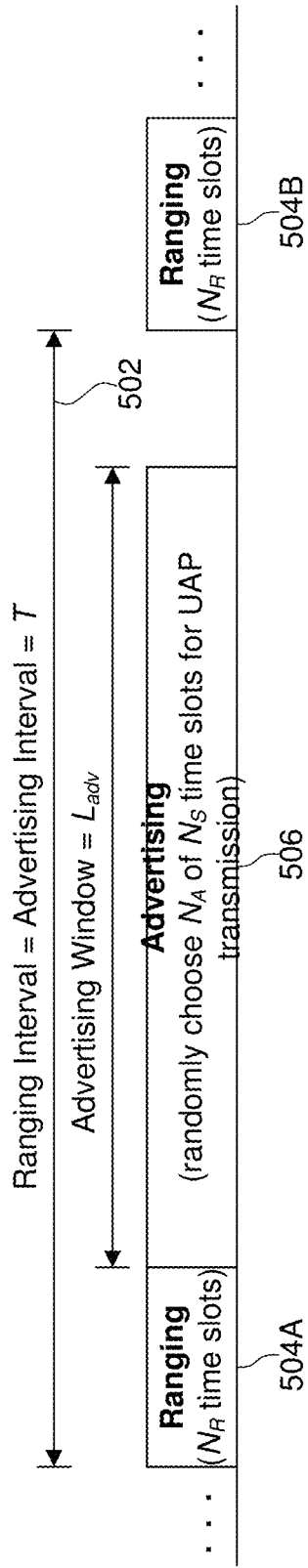
FIG. 5A illustrates an example ranging schedule for a mobile device for one-to-many MAC modes of ranging.

FIG. 5A illustrates an example ranging schedule for a mobile device for one-to-many ranging. The ranging techniques illustrated in FIG. 5A support both ranging and advertising for synchronization. The UWB advertising is no longer tied to BLE advertisements as described above. The UAPs can be transmitted during the advertising windows. This can avoid scheduling conflicts with poll packet transmissions during the ranging periods 504. These techniques can also employ a unique preamble or use a different RF channel for advertising than for ranging.

The ranging schedule can set a duty cycle for scanning and ranging for the mobile device that accounts for the power consumption of the UWB transceiver. The ranging schedule can include a ranging interval 502. The ranging interval 502 can be a period of time from a start of a ranging period 504A until the start of a subsequent ranging period 504B. The ranging interval 502 can include an advertising period 506. The advertising period 506 can include a number of advertising slots ($N_A$) of a total number of time slots ($N_S$) for UAP transmissions. The advertising period 506 can be abbreviated by $L_{adv}$.

1. Ranging Period

During the ranging interval 504A, the mobile device can conduct ranging between one or more participating mobile devices. The ranging schedule can define a predetermined number of ranging time slots ($N_R$) for ranging between the devices. The initial packet transmitted during the ranging period between a pair of devices can be known as a poll packet. During the ranging interval 504A the mobile device that transmitted the poll packet can then listen for responses. The ranging interval 502 can also be known as a superframe. In various embodiments, the probability of collisions between UWB packets can be reduced by increasing the number of access slots relative to the number of responding devices. In various embodiments, if there are more access slots than responding devices, then the probability of collisions between UWB packets can be reduced. These considerations are well-understood performance trades that one could make in terms of how many devices that the transmitting device is trying to range with and the size of the access slots so as to minimize the probability of collision. Once the transmitting device receives a response from the responding devices and depending on whether the exchange is a two packet exchange or a three packet exchange, the response packet can end the ranging session. In some use cases, there can be a third packet that can be transmitted to the responding device and so the responding device can more accurately calculate the range to the initiating/transmitting device. Regardless of what kind of ranging is performed (e.g., two-packet exchange, or three-packet exchange), all of the mobile devices need to know the timing as determined from the schedule in order to participate in the ranging sessions. These mobile devices need to know to listen for the poll packet and issue responses. The mobile devices need to be knowledgeable about the schedule so the advertising can be scheduled for a time when ranging will not occur in order to reduce the probability of collisions between UWB packets.

2. Advertising Period

During the advertising period 506, the mobile device can transmit to a certain number of time slots. The mobile device can randomly choose $N_A$ time slots to transmit UAP packets. This technique can be essentially a probabilistic game in which the mobile device can randomly advertise over an exemplary number of time slots (e.g., 10 slots) during the advertising period 506. Prior to receipt of the schedule from the UAP, the responding mobile device may just by happenstance be listening at the same time that the packet is being transmitted. At many times this can be hit and miss and the responding device might be listening for some listening window but it may not receive any UAPs at that point. The probability of the responding device actually receiving one of the UAPs can be calculated.

In the advertising period 506, the mobile device can broadcast one or more UAPs, which are UWB packets. In a prior art, these UAP packets necessarily had to be transmitted at fixed offsets from the BLE advertisement, e.g. as shown in FIG. 4, but in various embodiments of current invention, the UWB acquisition packets (UAPs) can be transmitted at random times within the advertising period, i.e. at times unrelated to BLE advertisements. The UAPs contain information for the beginning of the next ranging period. The information can be coded in terms of Δt or a time delay until the next ranging period. In this way, a new mobile device joining the ranging session can receive the UAP packet and know how long until the next ranging period. Once the mobile device acquires the information for the next ranging period it no longer needs to listen for UAPs. The purpose of the UAPs is for the very first time acquisition of timing information. The new mobile device can turn off the transceiver until a time just before the next transmission period. In this way the power used by the UWB transceiver is reduced.

B. Peer-to-Peer

Figure 5B:
FIG. 5B illustrates a first example ranging schedule for a mobile device for peer-to-peer ranging techniques according to embodiments of the present disclosure.
Figure 5C:
FIG. 5C illustrates a second example ranging schedule for a mobile device for peer-to-peer ranging techniques after timing signal has been acquired.

FIG. 5B illustrates a second example ranging schedule for a mobile device. FIGS. 5B and 5C illustrate peer-to-peer modes. In this technique, the advertising window 516 may be extended to the start of the next ranging interval 512 to allow more time for discovery and acquisition of the UWB signals. Using these techniques, once ranging has begun, advertising may stop to reduce power consumption. In peer-to-peer ranging, the receiving device needs to acquire the ranging schedule from the transmitting device to acquire the timing. The ranging schedule can include a ranging interval 512. The ranging interval 512 can be a period of time from a start of a ranging period 514A until the start of a subsequent ranging period 514B. The ranging interval 512 can include an extended advertising period 516. For acquisition, the extended advertising period 516 can continue until the start of the subsequent ranging period 514B.

FIG. 5C illustrates a third example ranging schedule for a mobile device. The ranging schedule can include a ranging interval 522. The ranging interval 522 can be a period of time from a start of a ranging period 524A until the start of a subsequent ranging period 524B. In the third ranging schedule the mobile device has acquired the timing schedule and the receiving device may not need to receive the advertising or the UAPs. The power consumption of the UWB system can be reduced because the advertising period is not required.

In various embodiments, UWB can be used for synchronization but another wireless protocol (e.g., Bluetooth, or BLE) can be used for discovering mobile devices that are nearby conduct ranging. Bluetooth and BLE can be advantageous because of the low energy consumption. However, there can be issues with using Bluetooth for discovery because Bluetooth has a much wider range than UWB. For example, a device can be discovered using Bluetooth, but the discovered device may be outside of the UWB range and thus unavailable for ranging.

An advantage of conducting device discovery using UWB wireless protocol is that the transmitting device will be capable of ranging with the discovered device when discovered.

In various embodiments, the transmitting device may periodically include an advertising period 506 so that it may discover another device.

C. Responding Device Scanning Techniques

For UWB Ranging techniques, the responding electronic device, also known as the responder, can be in a receiving mode to receive either the ranging poll messages during the ranging time slots or the UAPs during the advertising time slots. Having the UWB transceiver spend prolonged periods listening for the ranging poll messages or the UAPs can be power consuming for the responding electronic device. Various techniques have been developed to size a scan window and a scanning interval to reduce the power consumed by the responding electronic device.

1. Responding Device Knows the Ranging Interval

In various embodiments, the responding device can know the ranging interval. The ranging interval can be standard for certain types of mobile devices or hard coded in the mobile devices. The ranging interval can also be provided by the ranging application. When the ranging interval is known, the responding device can progressively scan for the signal. For example, if the transmitting device broadcasts the UAPs at a random time and the responding device only happens to be listening in the defined time slots, the responding device will not always want to listen during the same time period of the ranging interval because doing so may cause the responding device to continually miss the transmission of the ranging poll or the advertising message.

If the listening window does not change, the responding electronic device may never be listening during a window to receive one of these advertising packets. In one exemplary technique, the responding device can move the scanning window so as to progressively scan the advertising period. This can be done if the ranging interval is known by the responding device. The scanning cycle can be determined to be some interval of the scan interval. In that way, as the scanning window is progressively moved over a scan interval, it can progressively enter a UAP transmission window at some point in time in the advertising period.

But even listening during the advertising period, there may be no guarantee that the responding device is going to receive a UAP because there can be 40 or 50 time slots of which the transmitting device is only transmitting a UAP on a handful of the time slots. There may be many gaps or spaces due to the fact that just because the responding device happens to be scanning does not mean that the responding device will receive one of the UAPs. However, this allows for conducting the scanning in a very controlled way using the scan duty cycle. The transceiver can be in a power saving mode in between Scan Windows where the transceiver is inactive.

One of the additional challenges for responding devices to scan for a long period of time is the time sharing of the antenna with other components of the mobile device. For example, in several mobile devices the UWB antenna is shared with other wireless protocols (e.g., the Wi-Fi protocol). Because of the time sharing protocol, the UWB circuitry or communication circuitry cannot use the antenna for prolonged periods of time. In some cases, this sharing may allocate the UWB circuitry a 10% duty cycle which means that, in certain embodiments, the UWB circuitry can be used for 3 milliseconds followed by the UWB circuitry relinquishing control of the antenna for 30 milliseconds. The mobile device can transmit or receive on ultra-wideband because the antenna would be used for both. These duty cycle limitations can reduce the likelihood that the responding device will receive the UAP messages.

2. Progressive Scanning Techniques

The Media Access Control (MAC) protocol can use a time-division multiple access (TDMA) channel access method, which partitions time in repeating superframes. This allows several users or devices to share the same frequency channel by dividing the signal into different time slots. A superframe can be a sequence of slots, where each slot corresponds to a specific action to take (e.g., receiving or transmitting a UWB message). This can require all participating devices to be synchronized. Since UWB radios are more energy-hungry than common narrowband internet of things (IoT) transceivers, a separate transceiver can be used for all communication that is not related to ranging such as synchronization and reporting. However, due to design limitations, this may not always be possible.

Figure 6:
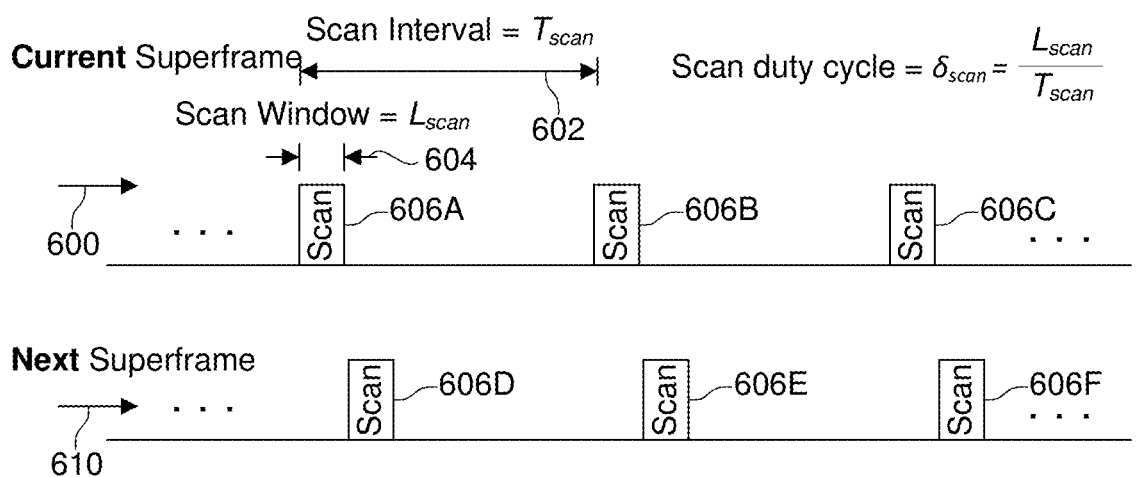
FIG. 6 illustrates a technique that can be used if the responding device knows the ranging interval.

FIG. 6 illustrates a progressive scanning technique that can be used if the responding device knows the ranging interval (e.g., for Informed responder). In the first superframe 600, the scan interval ($T_{scan}$) 602 can be known. The scan interval 602 can be the time between sequential listening periods for a responding device. During the scan interval 602 the transceiver can be in a power saving mode.

The scan window ($L_{scan}$) 604 can be the time period that the responding device is actively scanning (e.g., during first period 606A, second period 606B, third period 606C for the first superframe 600). During the scan window 604, the UWB circuitry can be active in order to receive UWB signals. In this technique, the responding device can know the scan interval 602. The responding device can employ a progressive scanning technique with uniformly spaced scan windows ($L_{scan}$) 604 separated by a scan interval 602. The scan interval ($T_{scan}$) 602 can be set such that the ranging interval (T)+the scan window ($L_{scan}$) 604 is an integer multiple of the scan interval ($T_{scan}$) 602. The scan window ($L_{scan}$) 604 can shift in time in every subsequent superframe to aid in the discovery of the devices for ranging. For example, in the next superframe 610, the scan windows (e.g., the fourth scan period 606D, the fifth scan period 606E, and the sixth time period 606E) can be offset by a fixed period of time from the first period 606A, the second period 606B, the third period 606C. The scan duty cycle can be calculated using the following formula:

$$\text{Scan duty cycle} = \delta_{scan} = \frac{L_{scan}}{T_{scan}}$$

3. Responding Devices do not Know the Ranging Interval

The UWB circuitry can operate on a predetermined duty cycle (e.g., a 10% duty cycle). This can be accomplished by setting the scan interval to be such that it is approximately 10%. In some cases, the responder mobile device does not know the ranging interval 502, 512, 522 as illustrated in FIGS. 5A-C. If the ranging interval 502, 512, 522 is not known, the techniques can be employed to improve the likelihood that the responding device can receive the UWB signal (e.g., the UAP).

One technique to improve the likelihood of reception of the UWB signal is to employ random dithering for the UWB circuitry. Random dithering can involve changing each scan window by some random amount of time (Ui). The random amount of time (Ui) can be positive or negative. For example, in one example, the scan window and the UAP transmissions can be completely out of phase with each other. In that case the UAP is transmitted when the UWB circuitry is off and not scanning and, when the UWB circuitry is on, the UAP messages are not transmitted. If the scan windows and the UAP transmissions occur at a defined cycle, it would be unlikely that a UAP transmission would occur when the UWB circuitry is scanning. In that case it is unlikely that a UAP message would be received. By employing random dithering, the scan window can change and increase the likelihood that the scan window will occur when a UAP transmission is broadcast. The scan interval can be set to roughly match the duty cycle in order to introduce a random time component to allow some dithering to take place. In this way, the scan intervals would be non-constant.

In previous techniques, if the responding device knows when the ranging was going to happen, it could alter the scanning periods to stay outside of the ranging periods. By adding randomness, it can help ensure that there is a possibility for the scanning periods to be within the advertising window.

An objective of synchronization is to determine when in time is the beginning of one of those ranging cycles. If the mobile device knows the beginning of one of those ranging cycles, then the mobile device can generally predict subsequent ranging intervals forward in time.

Figure 7:
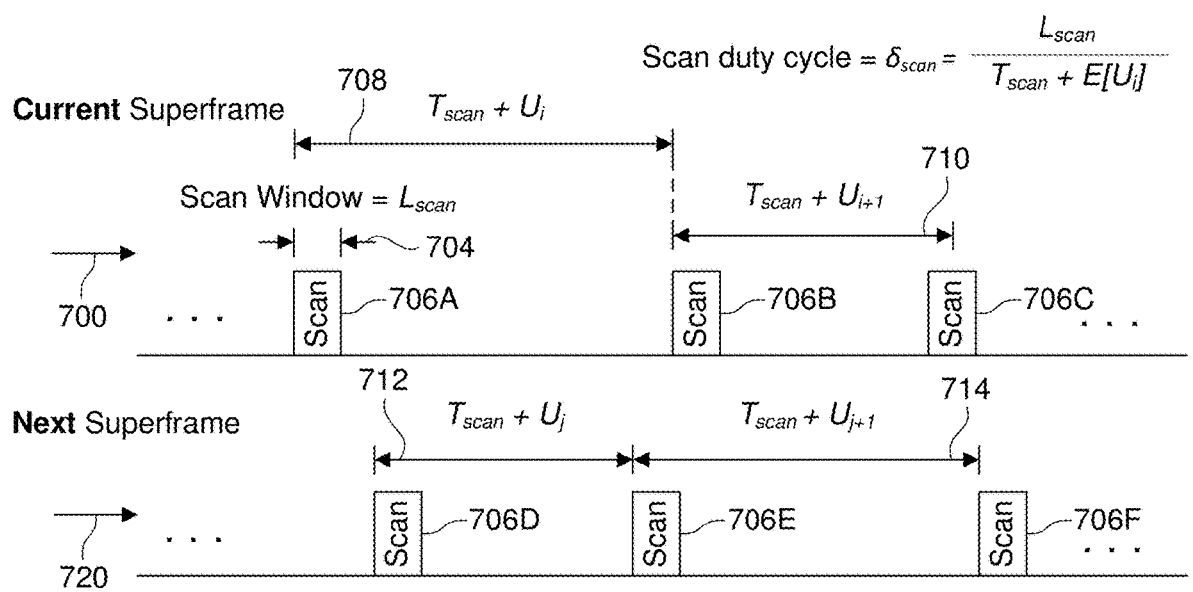
FIG. 7 illustrates a technique that can be used if the responding device does not know the ranging interval.

FIG. 7 illustrates a technique that can be used if the responding device does not know the ranging interval (e.g., for an Uninformed responder). Dithered scanning techniques can be employed between each scan window by some random amount ($U_i$). This allows for sufficient coverage balanced with conserving power for the discovery of the devices for ranging.

In the first superframe 700, the scan interval ($T_{scan}+U_i$) 708 can be unknown. The scan interval 708 can be the time between sequential listening periods for a responding device. The scan window ($L_{scan}$) 704 can be the time period that the responding device is scanning during the first scan period 706A, the second scan period 706B, and the third scan period 706C. The responding device can employ a dithered scanning technique in which each scan window can be dithered by some random amount $U_i$. The random amount $U_i$ can be positive or negative. In some embodiments, it may be desirable to have a zero mean which may require a uniformly distributed random variable that would need to be symmetric about zero. The scan interval between the first scan period 706A and the second scan period 706B can be $T_{scan}+U_i$. The time between the second scan period 706B and the third scan period 706D can be $T_{scan}+U_{i+1}$ 710.

The scan window can shift in every subsequent superframe to aid in the discovery of the devices for ranging. For example, in the next superframe 720, the scan interval between the first scan period in the second superframe 706D and the second scan period in the second superframe 706E is $T_{scan}+U_j$ 712. The scan interval between the second scan period in the second superframe 706E and the third scan period in the second superframe 706F is $T_{scan}+U_{j+1}$ 714.

The scanning 606D, 606E, 606E is offset by a fixed period of time from 606A, 606B, 606C. The scan duty cycle can be calculated using the following formula:

$$\text{Scan duty cycle} = \delta_{scan} = \frac{L_{scan}}{T_{scan} + E[Ui]}$$

In a non-limiting example, if a mobile device is ranging every 100 ms with 3 ms time slots, there can be 32 time slots. These time slots include both the ranging period and advertising period combined. In one example, the ranging period may only require four time slots. This would leave 29 time slots available for the advertising period. Out of those 29 time slots, the mobile device may want to advertise only over 10 time slots of the 29 available time slots. The transmission of UAPs do not consume much energy of the mobile device. The transmitting device can assist the responding devices by just transmitting more advertising packets. The receiving part of UWB is expensive from a power perspective. In various embodiments, the number of advertising messages could be scaled up to 29 time slots. A UAP in every time slot would increase the certainty the other mobile device would be discovered.

In another example, a scanning device can be operating at a 10% duty cycle. This means that it would be listening for 3 ms seconds and then would be off for 30 milliseconds. Therefore, there would be 26 time slots that are not being scanned. The system could calibrate the probability of the responding device with a certain duty cycle would be able to receive one of the UAPs. The probability of successful acquisition in one superframe could be calculated using the following formulas. The number of time slots not scanned in the advertising window of each superframe can be calculated as:

$$Q = [N_S(1-\delta_{scan})]$$

The probability of successful acquisition can equal the probability that at least one of $N_A$ advertising packets gets scanned (i.e., one minus the probability that all land in the Q unscanned slots).

$$P = 1 - \left(\frac{Q}{N_s}\right)\left(\frac{Q-1}{(N_s-1)}\right)\cdots\left(\frac{Q-N_A+1}{N_s-N_A+1}\right), \text{ for } 1 \leq N_A \leq Q$$

$$P = 1 - \frac{Q!}{N!}\frac{(N_s-N_A)!}{(Q-N_A)!}$$

The Mean-time-to-acquire (MTTA) can be determined by determining the probability of acquiring after K superframes/attempts (using a geometric distribution):

$$Pr(K=k) = (1-P)^{k-1}P, k = 1, 2, 3, \ldots$$

$$MTTA(\text{seconds}) = E(K)T = \frac{T}{P}$$

$$MTTA = \frac{T}{1 - \frac{Q!}{N_s!}\frac{(N_s-N_A)!}{(Q-N_A)!}} \text{ where } Q = N_A(1-\delta\text{scan})$$

In a first example of peer-to-peer ranging at 10 Hz with 3 ms time slots with a ranging interval (T)=100 ms, the number of time slots per superframe can be calculated as follows:

$$N = \frac{100 \text{ ms}}{3 \text{ ms}} \approx 33 \text{ slots}$$

The number of time slots that can be used for bi-directional ranging: $N_R$=4.
Therefore, the number of time slots available for advertising time period: $N_S$=33−4=29.
Assuming a 10% scan duty cycle with 3 ms scan window:

$$L_{scan}=3ms, T_{scan}=30ms, \delta_{scan}=0.1$$

$$Q=29(1-0.1)=26$$

If 10 UAPs are transmitted per superframe: $N_A$=10

$$MTTA = \frac{T}{1-\frac{Q!}{N_s!}\frac{(N_s-N_A)!}{(Q-N_A)!}} = \frac{100 \text{ ms}}{1-\frac{26!\,19!}{29!\,16!}} = 136.1 \text{ ms}$$

In a second example of peer-to-peer ranging at 5 Hz with 3 ms time slots with a ranging interval (T)=200 ms. The number of time slots per superframe can be calculated as follows:

$$N = \frac{200 \text{ ms}}{3 \text{ ms}} \approx 66 \text{ slots}$$

The number of time slots used for 2-packet ranging with 17 access slots: $N_R$=48.
Therefore, the number of time slots available for the advertising time period: $N_S$=66−18=48
Assuming a 10% scan duty cycle with 3 ms scan window:

$$L_{scan}=3ms, T_{scan}=30ms, \delta_{scan}=0.1$$

$$Q=48(1-0.1)=43$$

If 10 UAPs are transmitted per superframe: $N_A$=10

$$MTTA = \frac{T}{1-\frac{Q!}{N_s!}\frac{(N_s-N_A)!}{(Q-N_A)!}} = \frac{200 \text{ ms}}{1-\frac{43!\,38!}{48!\,33!}} = 282.9 \text{ ms}$$

These equations can apply whether the scenario is an informed responder or uninformed responder because of having a similar scan duty cycle.

V. Mean Time to Acquisition

Mean time to acquisition (MTTA) can be a key performance indicator for a ranging system. As discussed above due to missing UAPs it can take time for a mobile device to acquire a signal for a ranging session. MTTA for a ranging system can depend on a scan duty cycle and a number of UAP packets transmitted. The MTTA can be measured in seconds.

A. Peer-to-Peer Ranging

Figure 8:
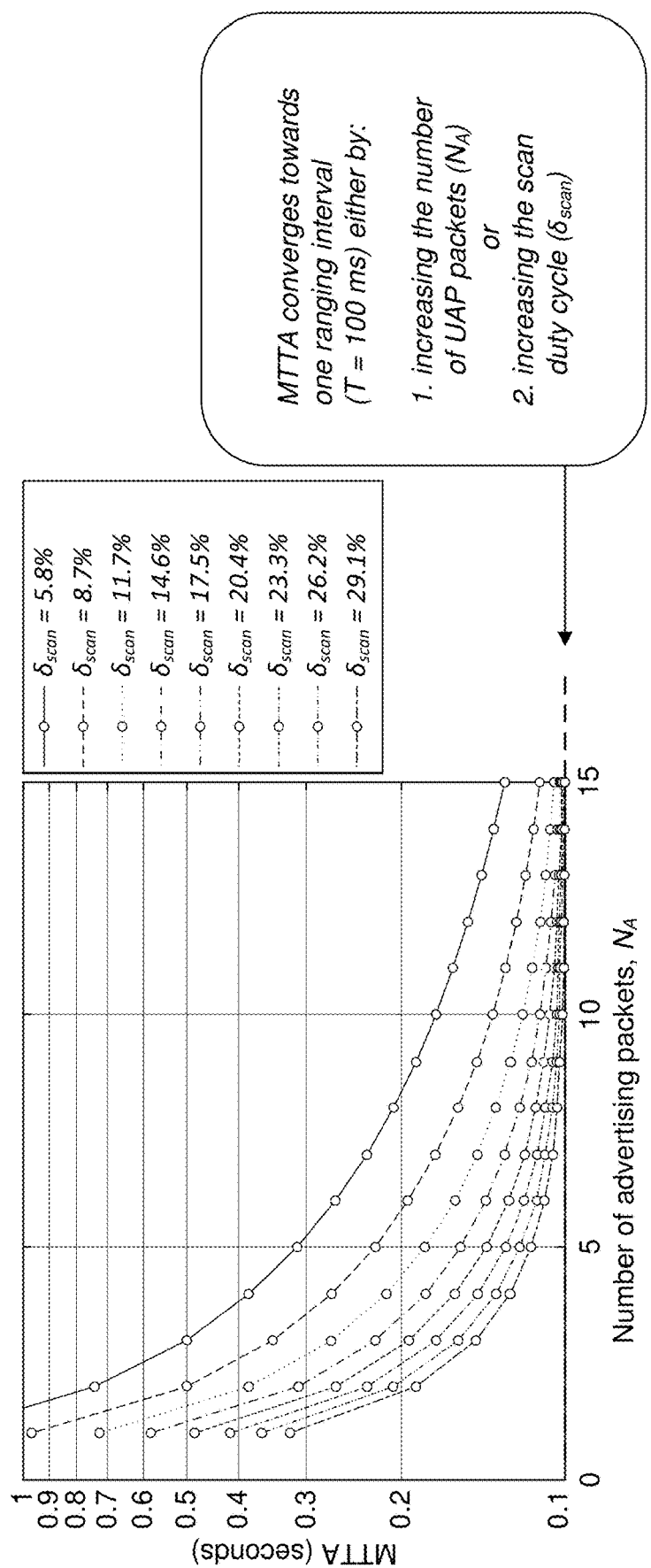
FIG. 8 illustrates a chart of the mean time to acquisition based on the number of advertising packets for peer-to-peer ranging.

FIG. 8 illustrates a chart of the MTTA based on the number of advertising packets for peer-to-peer ranging. Various plots of different duty cycles ($\delta_{scan}$) are depicted. As can be seen in FIG. 8, the MTTA converges towards one ranging interval (T=100 ms) either by increasing the number of UAP packets ($N_A$) or increasing the scan duty cycle ($\delta_{scan}$). As the duty cycle ($\delta_{scan}$) increases from 5.8% to 29.1%, the MTTA decreases. As shown in FIG. 8, the MTTA converges toward an MTTA of 0.1 seconds, as either the scan duty cycle increases or the number of advertising packets increases or both.

In this example, a ranging interval is 100 milliseconds so the MTTA can be seen as converging towards an average after just acquiring just one ranging interval. After 100 milliseconds would be one ranging interval. After 200 milliseconds would be two ranging intervals. As shown in FIG. 8, there appears to be an ideal spot, in which the mobile device would pick the curve with a 8.7% duty cycle when the curves on which the mobile device is operating have a duty cycle of no more than 10%. In this scenario the mobile device would broadcast 10 advertising packets for a superframe. In one and a half superframes on average, the mobile device may be able to acquire better timing. One of the objectives is to determine operating parameters that are suitable for relatively quick detection and acquisition but that are not too energy intensive, especially for the responding devices.

B. One-to-Many Ranging

Figure 9:
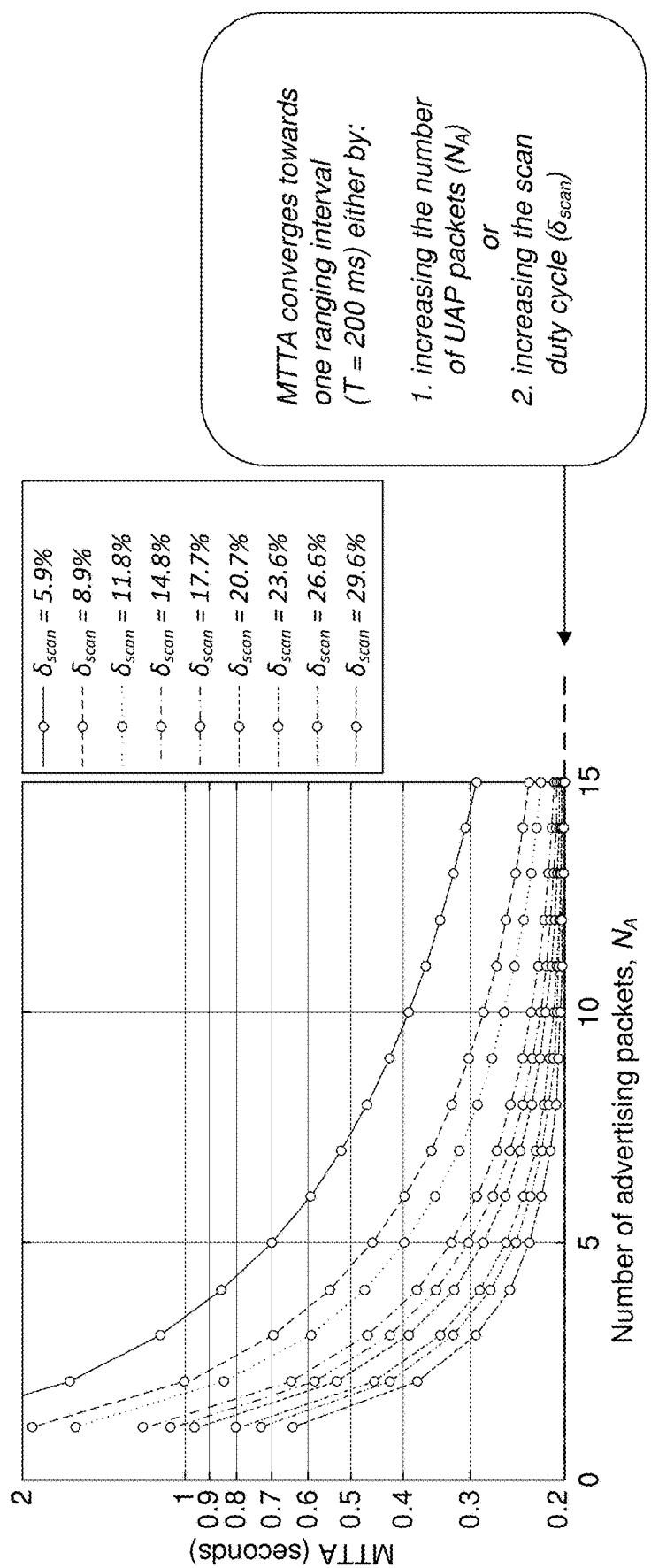
FIG. 9 illustrates a chart of the mean time to acquisition based on the number of advertising packets for point to share of one-to-many ranging techniques.

FIG. 9 illustrates a chart of the MTTA based on the number of advertising packets for point to share of one-to-many ranging. Various plots of different duty cycles ($\delta_{scan}$) are depicted. As can be seen in FIG. 9, the MTTA converges towards one ranging interval (T=200 ms) either by increasing the number of UAP packets ($N_A$) or increasing the scan duty cycle ($\delta_{scan}$). As the duty cycle ($\delta_{scan}$) increases from 5.9% to 29.6%, the MTTA decreases. As shown in FIG. 9 the MTTA converges toward a MTTA of 0.2 seconds as either the scan duty cycle increases or the number of advertising packets increases or both.

VI. Techniques for UWB Synchronization

Techniques for UWB synchronization are disclosed for both a transmitting device and a receiving device. The techniques can be employed for peer-to-peer ranging or one-to-many ranging.

A. Transmitting Device

Figure 10:
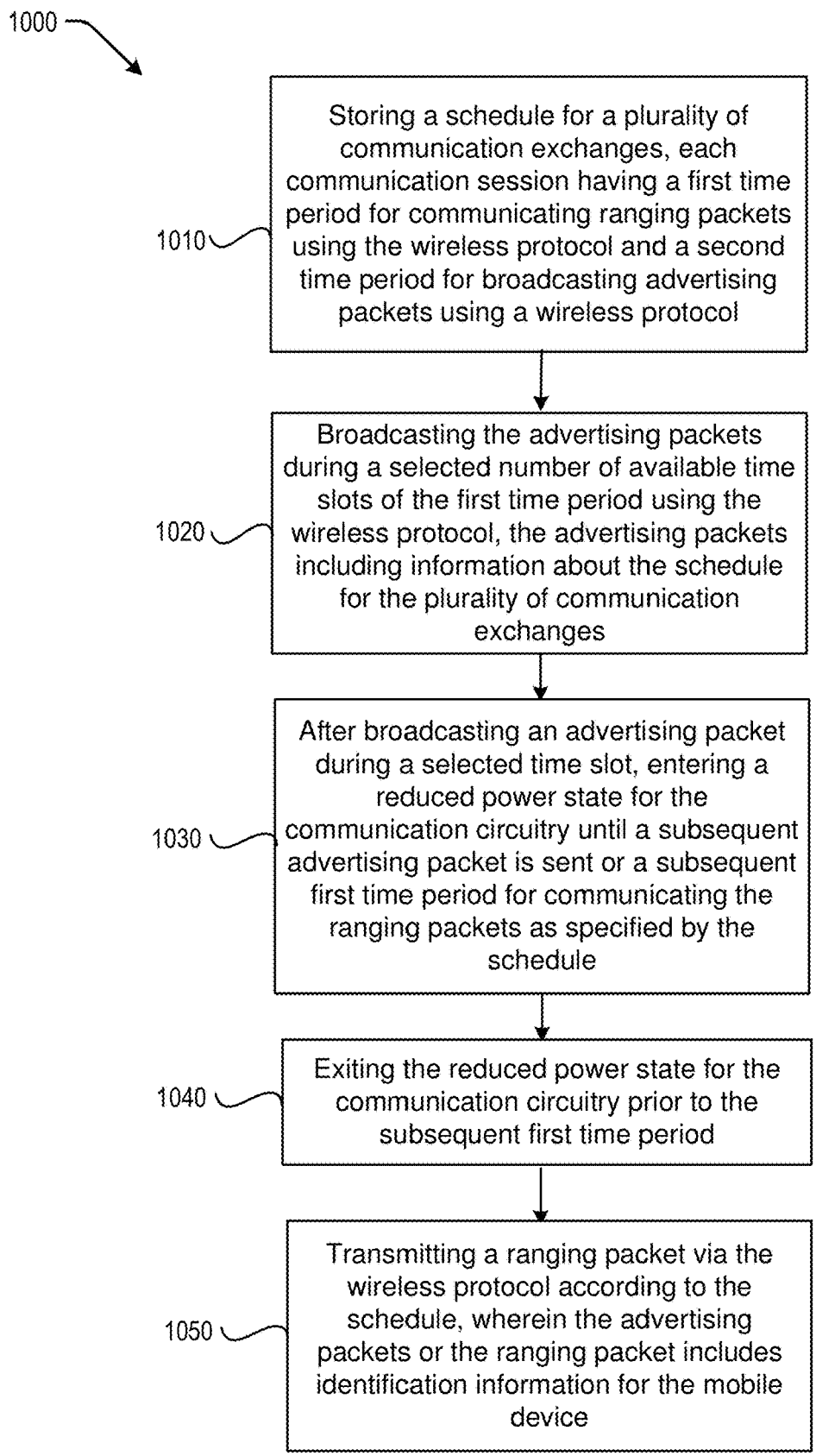
FIG. 10 illustrates a first flowchart of an example process associated with techniques to synchronize UWB ranging activities.

FIG. 10 is a flowchart of an example process 1000 associated with techniques to synchronize UWB ranging activities for the transmitting device. In some implementations, one or more process blocks of FIG. 10 may be performed by an electronic device (e.g., mobile device 1300 of FIG. 13). In some implementations, one or more process blocks of FIG. 10 may be performed by another device or a group of devices separate from or including the mobile device 1300. Additionally, or alternatively, one or more process blocks of FIG. 10 may be performed by one or more components of device 1300, such as processor 1318, computer-readable medium 1302, input/output subsystem 1306, wireless circuitry 1308, GPS unit 1348, location/motion module 1326, applications 1354, and/or ranging module 1328.

At block 1010, the process 1000 can include storing a schedule for a plurality of communication sessions. The schedule can be stored in a memory of one or more electronic devices. According to the schedule, each communication session can include a first time period for communicating ranging packets using the wireless protocol and a second time period for broadcasting advertising packets using a wireless protocol. The wireless protocol can be UWB.

The first time period for communicating ranging packets can be divided into multiple ranging time slots. The number of time slots can be determined based on the number of electronic devices in the ranging session. The second time period for communicating advertising packages can be divided into a number of time slots for communicating advertising messages. The number of time slots for communicating advertising packets may be adjusted. For example, by increasing the number of communication slots, the MTTA can be decreased.

At block 1020, the process 1000 can include broadcasting the advertising packets during a selected number of available time slots of the second time period using the wireless protocol. The advertising packets can include information about the schedule for the plurality of communication sessions. The information can include a time delay until the transmission of the next poll message during a ranging round. The advertising packets can be broadcast over UWB wireless protocol. In various embodiments, the one or more selected advertising periods can be randomly selected. In various embodiments, the process 1000 can include extending the second time period until the subsequent first time period.

In various embodiments, the process 1000 can include ceasing broadcasting the advertising packet after a ranging session has begun for peer-to-peer ranging.

In various embodiments, the advertising packets for the one or more electronic devices include different preambles. In various embodiments, the advertising packets for the one or more electronic devices are communicated via a different radio frequency than the ranging packets.

At block 1030, the process 1000 can include, after broadcasting an advertising packet during a selected time slot, entering a reduced power state for the UWB communication circuitry until a subsequent advertising packet is sent or a subsequent first time period for communicating the ranging packets as specified by the schedule. The reduced power state allows the mobile device to conserve battery power.

At block 1040, the process 1000 can include exiting the reduced power state for the communication circuitry prior to the subsequent first time period.

At block 1050, the process 1000 can include transmitting a ranging packet via the wireless protocol according to the schedule, wherein the advertising packets or the ranging packet includes identification information for the mobile device. In various embodiments, the ranging packets for the one or more electronic devices include different preambles.

In various embodiments, a mobile device can include one or more memories and one or more processors in communication with the one or more memories and configured to execute instructions stored in the one or more memories to perform operations of a method described above.

In various embodiments, a computer-readable medium may store a plurality of instructions that, when executed by one or more processors of a computing device, cause the one or more processors to perform operations of any of the methods described above.

Although FIG. 10 shows example steps of process 1000, in some implementations, process 1000 can include additional steps, fewer steps, different steps, or differently arranged steps than those depicted in FIG. 10. Additionally, or alternatively, two or more of the steps of process 1000 can be performed in parallel.

B. Responding Device

Figure 11:
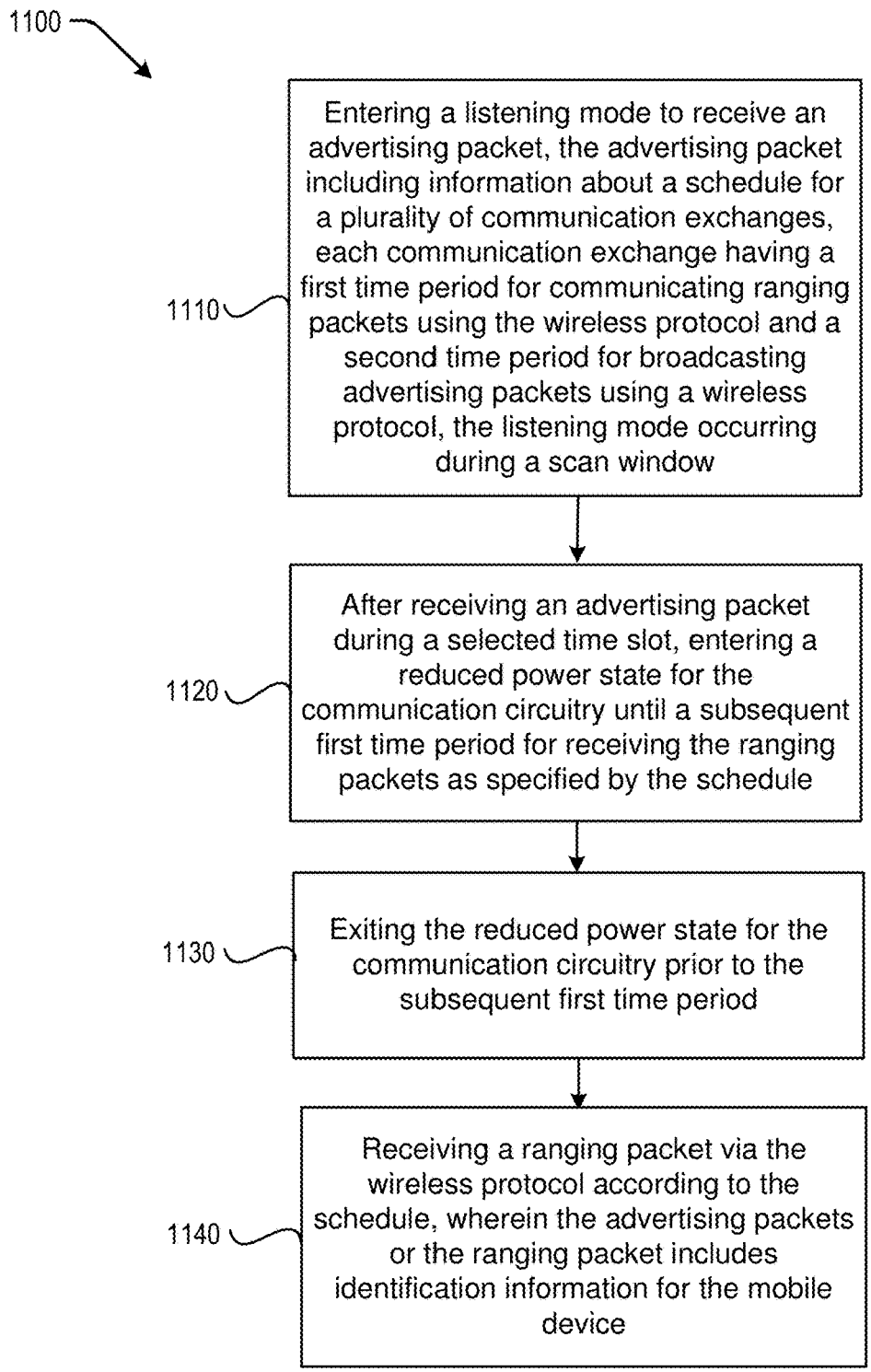
FIG. 11 illustrates a second flowchart of an example process associated with techniques to synchronize UWB ranging activities.

FIG. 11 is a flowchart of an example process 1100 associated with techniques to synchronize UWB ranging activities for the responding device. In some implementations, one or more process blocks of FIG. 11 may be performed by an electronic device (e.g., mobile device 1300 of FIG. 13). In some implementations, one or more process blocks of FIG. 11 may be performed by another device or a group of devices separate from or including the mobile device 1300. Additionally, or alternatively, one or more process blocks of FIG. 11 may be performed by one or more components of device 1300, such as processor 1318, computer-readable medium 1302, input/output subsystem 1306, wireless circuitry 1308, GPS unit 1348, location/motion module 1326, applications 1354, and/or ranging module 1328.

At block 1110, process 1100 can include entering a listening mode to receive an advertising packet. During the listening mode the UWB circuitry can be powered to receive UWB signals. The advertising packet can include information about a schedule for a plurality of communication sessions. The schedule can be stored in a memory of the mobile device. Each communication session can include a first time period for communicating ranging packets using the wireless protocol and a second time period for broadcasting advertising packets using a wireless protocol (e.g., UWB protocol). The listening mode can occur during a scan window.

At block 1120, after receiving an advertising packet during a selected time slot, process 1100 can include entering a reduced power state for the communication circuitry until a subsequent first time period for receiving the ranging packets as specified by the schedule.

At block 1130, process 1100 can include exiting the reduced power state for the communication circuitry prior to the subsequent first time period as determined by the schedule stored in the memory.

At block 1140, process 1100 can include receiving a ranging packet via the wireless protocol according to the schedule. The advertising packets or the ranging packet can include identification information for the mobile device.

In various embodiments, process 1100 can include progressively scanning the second time period using a scan interval comprising an interval multiple of a duration of a ranging interval of a transmitting device plus a duration of a scan window.

In various embodiments, process 1100 can include dithering each scan window by a random time component such that a scan interval comprises a scan interval plus the random time component.

In various embodiments, a mobile device can include one or more memories and one or more processors in communication with the one or more memories and configured to execute instructions stored in the one or more memories to performing operations of a method described above.

In various embodiments, a computer-readable medium may store a plurality of instructions that, when executed by one or more processors of a computing device, cause the one or more processors to perform operations of any of the methods described above.

Although FIG. 11 shows example steps of process 1100, in some implementations, process 1100 can include additional steps, fewer steps, different steps, or differently arranged steps than those depicted in FIG. 11. Additionally, or alternatively, two or more of the steps of process 1100 can be performed in parallel.

VII. Electronic Device for Performing Communications

Figure 12:
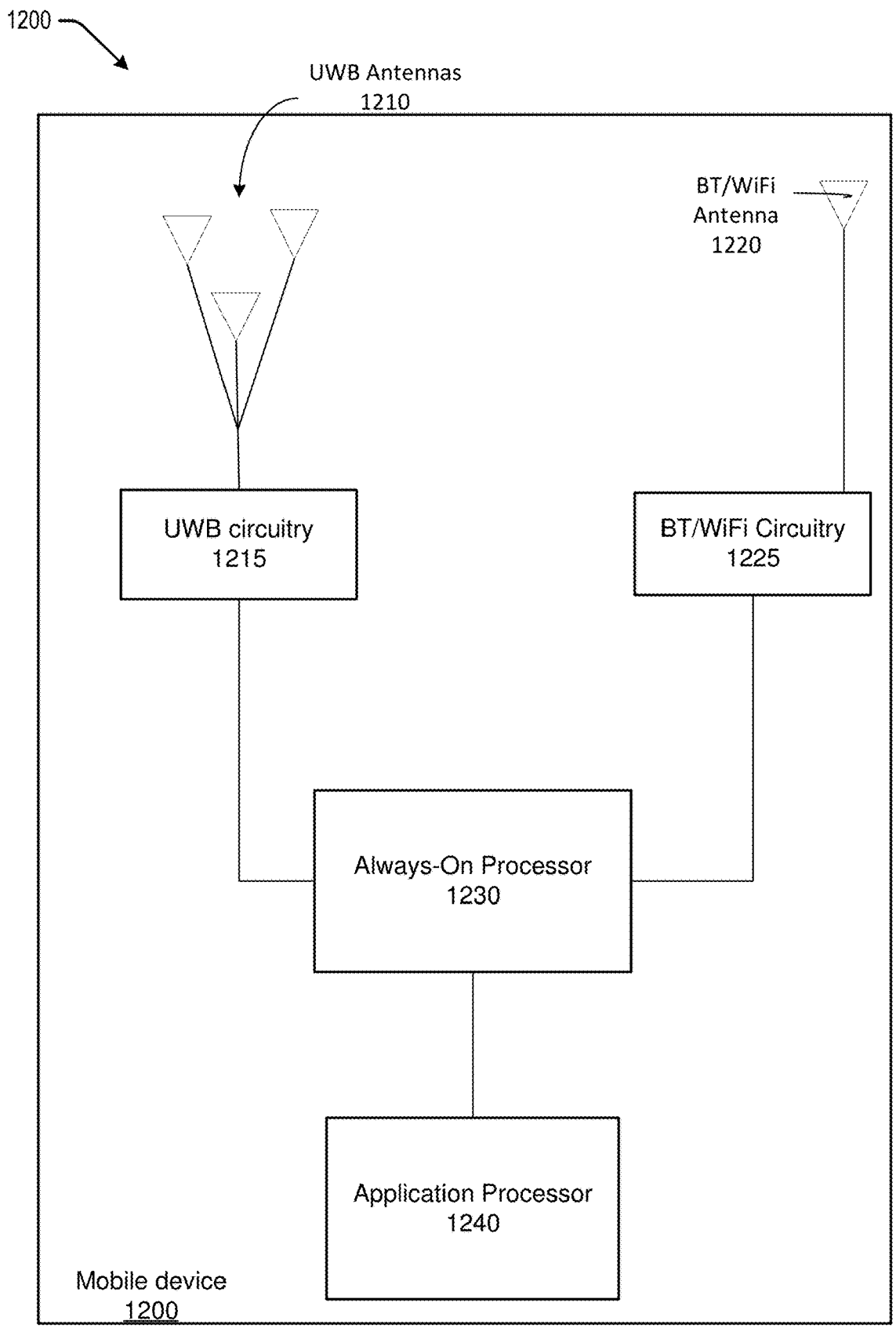
FIG. 12 is a block diagram of components of an electronic device operable to perform ranging according to embodiments of the present disclosure.

FIG. 12 is a block diagram of components of a mobile device 1200 operable to perform passive beacon communication techniques according to embodiments of the present disclosure. Mobile device 1200 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1200 includes UWB antennas 1210 for performing ranging. UWB antennas 1210 are connected to UWB circuitry 1215 (e.g., communication circuitry) for analyzing detected signals from UWB antennas 1210. In some embodiments, mobile device 1200 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1215 can communicate with an always-on processor (AOP) 1230, which can perform further processing using information from UWB messages. For example, AOP 1230 can perform the ranging calculations using timing data provided by UWB circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. Bluetooth (BT)/Wi-Fi antenna 1220 is connected to BT/Wi-Fi circuitry 1225 for analyzing detected signals from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags against which to compare a received tag, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

Coordination by AOP 1230 can have various benefits. For example, a first user of a sending device may want to share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1230. In addition, it is not desirable to wake up the application processor of every other device in the room, and thus the AOPs of the other devices can perform some processing of the messages and determine that the destination address is for a different device.

To perform ranging, BT/Wi-Fi circuitry 1225 can analyze an advertisement signal from another device to determine that the other device wants to perform ranging, e.g., as part of a process for sharing content. BT/Wi-Fi circuitry 1225 can communicate this notification to AOP 1230, which can schedule UWB circuitry 1215 (or communication circuitry) to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Electronic Device

Figure 13:
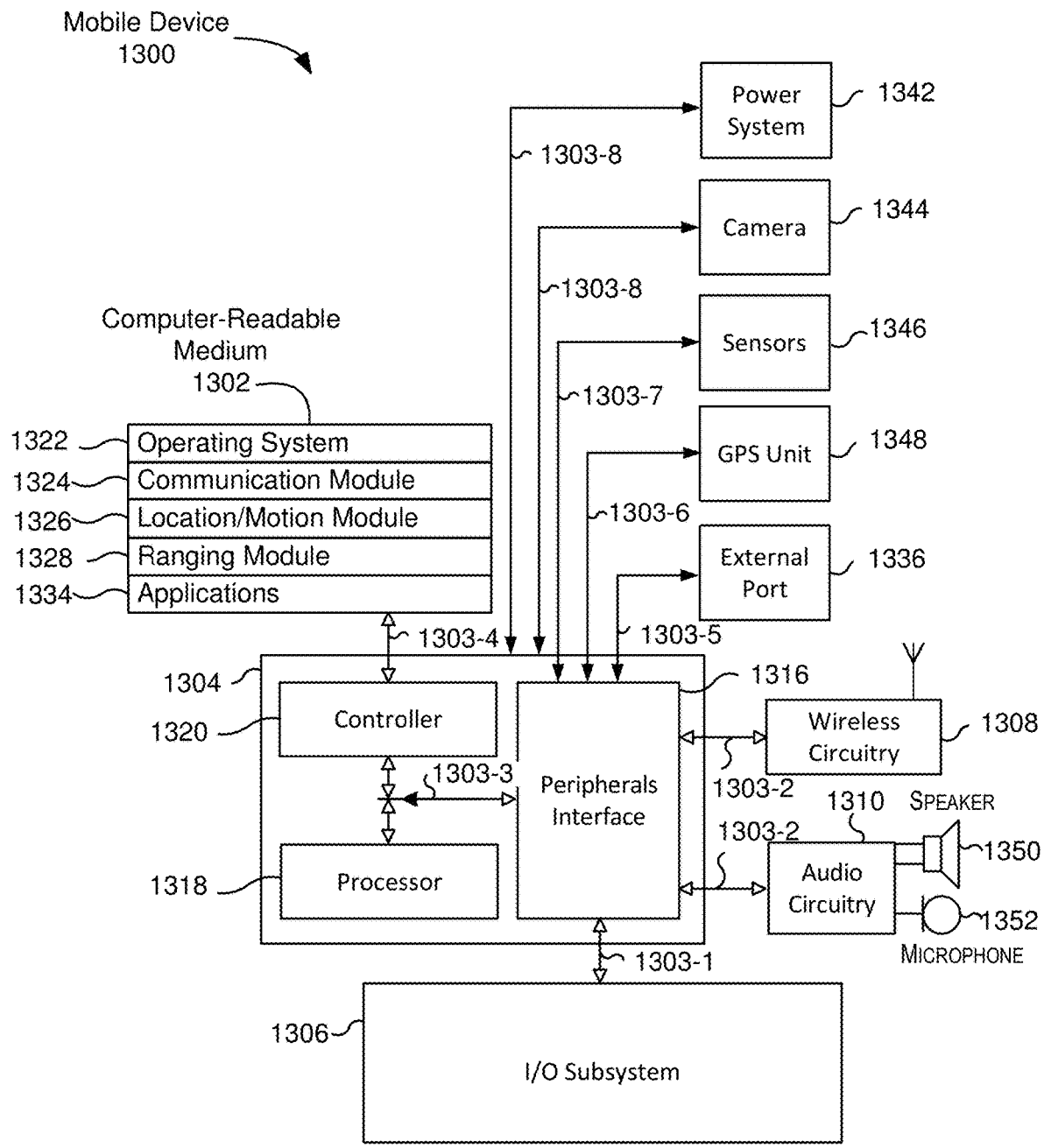
FIG. 13 is a block diagram of an example device according to embodiments of the present disclosure.

FIG. 13 is a block diagram of an example electronic device 1300. Device 1300 generally includes computer-readable medium 1302, control circuitry 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application-specific integrated circuits.

Wireless circuitry 1308 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1308 can use various protocols, e.g., as described herein. In various embodiments, wireless circuitry 1308 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1308 is coupled to control circuitry 1304 via peripherals interface 1316. Peripherals interface 1316 can include conventional components for establishing and maintaining communication between peripherals and the other components of the electronic device 1300. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of device 1300 to the one or more processors 1318 and computer-readable medium 1302. One or more processors 1318 communicate with computer-readable medium 1302 via a controller 1320. Computer-readable medium 1302 can be any device or medium that can store code and/or data for use by one or more processors 1318. Computer-readable medium 1302 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 1316, one or more processors 1318, and controller 1320 can be implemented on a single chip, such as control circuitry 1304. In some other embodiments, they can be implemented on separate chips.

Processor(s) 1318 can include hardware and/or software elements that perform one or more processing functions, such as mathematical operations, logical operations, data manipulation operations, data transfer operations, controlling the reception of user input, controlling output of information to users, or the like. Processor(s) 1318 can be embodied as one or more hardware processors, microprocessors, or microcontrollers; field programmable gate arrays (FPGAs); application-specified integrated circuits (ASICs); or the like.

Device 1300 may include storage and processing circuitry such as control circuitry 1304. Control circuitry 1304 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1304 may be used to control the operation of device 1300. This processing circuitry may be based on one or more microprocessors, microcontrollers, digital signal processors, baseband processor integrated circuits, application-specific integrated circuits, etc.

Control circuitry 1304 may be used to run software on device 1300, such as internet browsing applications, voice-over-internet-protocol (VOIP) telephone call applications, email applications, media playback applications, operating system functions, etc. To support interactions with external equipment, control circuitry 1304 may be used in implementing communications protocols. Communications protocols that may be implemented using control circuitry 1304 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1300 may include input/output subsystem 1306. Input/output subsystem 1306 may include input-output devices. Input/output devices may be used to allow data to be supplied to device 1300 and to allow data to be provided from device 1300 to external devices. Input/output devices may include user interface devices, data port devices, and other input-output components. For example, input/output devices may include one or more displays (e.g., touch screens or displays without touch sensor capabilities), one or more image sensors 1344 (e.g., digital image sensors), motion sensors, and speakers 1350. Input-output devices may also include buttons, joysticks, scrolling wheels, touch pads, key pads, keyboards, microphones 1352, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes an image sensor 1344 (e.g., a camera). In some embodiments, device 1300 includes sensors 1346. Sensors can include accelerometers, compass, gyrometer, pressure sensors, audio sensors, light sensors, barometers, and the like. Sensors 1346 can be used to sense location aspects, such as auditory or light signatures of a location.

In some embodiments, device 1300 can include a Global Positioning System (GPS) receiver, sometimes referred to as a GPS unit 1348. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module 1324 (or set of instructions), a location module 1326 (or set of instructions), a ranging module 1328 that is used as part of ranging operation described herein, and other application programs 1334 (or set of instructions).

Operating system 1322 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1326 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data.

Ranging module 1328 can send/receive ranging messages to/from an antenna, e.g., connected to wireless circuitry 1308. The messages can be used for various purposes, e.g., to identify a sending antenna of a device, or determine timestamps of messages to determine a distance of mobile device 1300 from another device. Ranging module 1328 can exist on various processors of the device, e.g., an always-on processor (AOP), a UWB chip, and/or an application processor. For example, parts of ranging module 1328 can determine a distance on an AOP, and another part of the ranging module can interact with a sharing module, e.g., to display a position of the other device on a screen in order for a user to select the other device to share a data item. Ranging module 1328 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1300 (e.g., portions of the display cover layer, portions of a plastic antenna window in a metal housing sidewall portion of housing, etc.). With one illustrative configuration, some or all of the rear face of device 1300 may be formed from a dielectric. For example, the rear wall of the housing may be formed from glass plastic, ceramic, other dielectric. In this type of arrangement, antennas may be mounted within the interior of device 1300 in a location that allows the antennas to transmit and receive antenna signals through the rear wall of device 1300 (and, if desired, through optional dielectric sidewall portions in housing). Antennas may also be formed from metal sidewall structures in housing and may be located in peripheral portions of device 1300.

To avoid disrupting communications when an external object such as a human hand or other body part of a user blocks one or more antennas, antennas may be mounted at multiple locations in the housing. Sensor data such as proximity sensor data, real-time antenna impedance measurements, signal quality measurements such as received signal strength information, and other data may be used in determining when one or more antennas is being adversely affected due to the orientation of the housing, blockage by a user's hand or other external object, or other environmental factors. Device 1300 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1300 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1300. As an example, antennas may be mounted at one or both ends of device 1300 (e.g., along the upper and lower edges of the housing, at the corners of the housing, etc.).

Antennas in device 1300 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1300 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1344 may include one or more visible digital image sensors (visible-light cameras) and/or one or more infrared digital image sensors (infrared-light cameras). Image sensors 1344 may, if desired, be used to measure distances. For example, an infrared time-of-flight image sensor may be used to measure the time that it takes for an infrared light pulse to reflect back from objects in the vicinity of device 1300, which may in turn be used to determine the distance to those objects. Visible imaging systems such as a front and/or rear-facing camera in device 1300 may also be used to determine the position of objects in the environment. For example, control circuitry 1304 may use image sensors 1344 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1304 may rely entirely upon image sensors 1344 to perform simultaneous localization and mapping, or control circuitry 1304 may synthesize image data with range data from one or more distance sensors (e.g., light-based proximity sensors). If desired, control circuitry 1304 may use display to display a visual representation of the mapped environment.

Input-output devices may include motion sensor circuitry 1346. Motion sensor circuitry 1346 may include one or more accelerometers (e.g., accelerometers that measure acceleration along one, two, or three axes), gyroscopes, barometers, magnetic sensors (e.g., compasses), image sensors (e.g., image sensor 1344) and other sensor structures. Sensors 1346 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1304 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1304. Movement generation circuitry may include electromechanical actuator circuitry that, when driven, moves device 1300 in one or more directions. For example, movement generation circuitry may laterally move device 1300 and/or may rotate device 1300 around one or more axes of rotation. Movement generation circuitry may, for example, include one or more actuators formed at one or more locations of device 1300. When driven by a motion control signal, actuators may move (e.g., vibrate, pulse, tilt, push, pull, rotate, etc.) to cause device 1300 to move or rotate in one or more directions. The movement may be slight (e.g., not noticeable or barely noticeable to a user of device 1300), or the movement may be substantial. Actuators may be based on one or more vibrators, motors, solenoids, piezoelectric actuators, speaker coils, or any other desired device capable of mechanically (physically) moving device 1300.

Some or all of movement generation circuitry such as actuators may be used to perform operations that are unrelated to rotation of device 1300. For example, actuators may include vibrators that are actuated to issue a haptic alert or notification to a user of device 1300. Such alerts may include, for example, a received text message alert identifying that device 1300 has received a text message, a received telephone call alert, a received email alert, an alarm notification alert, a calendar notification alert, or any other desired notification. By actuating the actuator, device 1300 may inform the user of any desired device condition.

Motion sensor circuitry may sense motion of device 1300 that is generated by movement generation circuitry. If desired, motion sensor circuitry may provide feedback signals associated with the sensed motion of device 1300 to movement generation circuitry. Movement generation circuitry may use the feedback signals to control actuation of the movement generation circuitry.

Control circuitry 1304 may use motion sensor circuitry and/or movement generation circuitry to determine the angle of arrival of wireless signals received by device 1300 from another electronic device. For example, control circuitry 1304 may use movement generation circuitry to move device 1300 from one position to another. Motion sensor circuitry may be used to track the movement of device 1300 as it is moved between the different positions. At each position, control circuitry 1304 may receive wireless signals from another electronic device. Control circuitry 1304 may process the received wireless signals together with the motion data from motion sensor circuitry to more accurately determine the position of the other electronic device. The use of motion generation circuitry is merely illustrative, however. If desired, motion sensor circuitry may track movement of device 1300 that is not caused by motion generation circuitry. This may include a user's natural, unprompted movement of device 1300 and/or the user's movement of device 1300 after the user is prompted (by display, audio circuitry 1310, a haptic output device in device 1300, or any other suitable output device) to move device 1300 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1308 may include radio-frequency transceiver circuitry for handling various radio-frequency communications bands. For example, wireless circuitry 1308 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1375 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1300 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1334 on device 1300 can include any applications installed on the device 1300, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1306 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or trackpad. In some embodiments, I/O subsystem 1306 can include a touch-sensitive display. A touch-sensitive display can also accept input from the user based at least in part on haptic and/or tactile contact. In some embodiments, a touch-sensitive display forms a touch-sensitive surface that accepts user input. The touch-sensitive display/surface (along with any associated modules and/or sets of instructions in computer-readable medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1306 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device 1300 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer-readable medium may be any combination of such storage or transmission devices.

Computer programs incorporating various features of the present disclosure may be encoded on various computer-readable storage media; suitable media include magnetic disk or tape, optical storage media, such as compact disk (CD) or DVD (digital versatile disk), flash memory, and the like. Computer-readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer-readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment of the present invention may be created using a data signal encoded with such programs. Computer-readable media encoded with the program code may be packaged with a compatible device or provided separately from other devices (e.g., via Internet download). Any such computer-readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method for performing ranging by a mobile device with one or more electronic devices using communication circuitry implementing a wireless protocol, the method comprising performing by the mobile device:
   storing a schedule for a plurality of communication exchanges, each communication exchange having a first time period for communicating ranging packets using the wireless protocol and a second time period for broadcasting advertising packets using the wireless protocol;
   broadcasting the advertising packets during a selected number of available time slots of the second time period of a first communication exchange using the wireless protocol, the advertising packets including information about the schedule for the plurality of communication exchanges;
   responsive to broadcasting an advertising packet during a selected time slot, entering a reduced power state for the communication circuitry until a subsequent advertising packet is sent during the second time period of a second communication exchange or a subsequent first time period for communicating the ranging packets as specified by the schedule;
   exiting the reduced power state for the communication circuitry prior to the subsequent first time period; and
   transmitting, via the wireless protocol, a ranging packet during the subsequent first time period according to the schedule.

2. The method of claim 1, wherein the advertising packets and the ranging packet includes identification information for the mobile device.

3. The method of claim 1, further comprising extending the second time period until the subsequent first time period.

4. The method of claim 1, further comprising ceasing broadcasting the advertising packet after a ranging session has commenced.

5. The method of claim 1, wherein the advertising packets for the one or more electronic devices include different preambles.

6. The method of claim 1, wherein the ranging packets for the one or more electronic devices include different preambles.

7. The method of claim 1, wherein the advertising packets for the one or more electronic devices are communicated via a different radio frequency than the ranging packets.

8. The method of claim 1, wherein the selected time slot is randomly selected.

9. A mobile device for performing ranging with one or more electronic devices using communication circuitry implementing a wireless protocol, comprising:
a memory comprising computer-executable instructions; and one or more processors in communication with the memory and configured to access the memory and execute the computer-executable instructions to perform operations comprising:
storing a schedule for a plurality of communication exchanges, each communication exchange having a first time period for communicating ranging packets using the wireless protocol and a second time period for broadcasting advertising packets using the wireless protocol;
broadcasting the advertising packets during a selected number of available time slots of the second time period of a first communication exchange using the wireless protocol, the advertising packets including information about the schedule for the plurality of communication exchanges;
responsive to broadcasting an advertising packet during a selected time slot, entering a reduced power state for the communication circuitry until a subsequent advertising packet is sent during the second time period of a second communication exchange or a subsequent first time period for communicating the ranging packets as specified by the schedule;
exiting the reduced power state for the communication circuitry prior to the subsequent first time period; and
transmitting, via the wireless protocol, a ranging packet during the subsequent first time period according to the schedule.

10. The mobile device of claim 9, wherein the advertising packets and the ranging packet includes identification information for the mobile device.

11. The mobile device of claim 9, further comprising extending the second time period until the subsequent first time period.

12. The mobile device of claim 9, wherein the operations further comprise ceasing broadcasting the advertising packet after a ranging session has commenced.

13. The mobile device of claim 9, wherein the advertising packets for the one or more electronic devices include different preambles.

14. The mobile device of claim 9, wherein the ranging packets for the one or more electronic devices include different preambles.

15. The mobile device of claim 9, wherein the advertising packets for the one or more electronic devices are communicated via a different radio frequency than the ranging packets.

16. A non-transitory computer-readable storage media comprising computer-executable instructions that, when executed by one or more processors, cause the one or more processors to perform operations by a mobile device for performing ranging with one or more electronic devices using communication circuitry implementing a wireless protocol, the operations comprising:
storing a schedule for a plurality of communication exchanges, each communication exchange having a first time period for communicating ranging packets using the wireless protocol and a second time period for broadcasting advertising packets using the wireless protocol;
broadcasting the advertising packets during a selected number of available time slots of the second time period of a first communication exchange using the wireless protocol, the advertising packets including information about the schedule for the plurality of communication exchanges;
responsive to broadcasting an advertising packet during a selected time slot, entering a reduced power state for the communication circuitry until a subsequent advertising packet is sent during the second time period of a second communication exchange or a subsequent first time period for communicating the ranging packets as specified by the schedule;
exiting the reduced power state for the communication circuitry prior to the subsequent first time period; and
transmitting, via the wireless protocol, a ranging packet during the subsequent first time according to the schedule.

17. The non-transitory computer-readable storage media of claim 16, wherein the advertising packets and the ranging packet includes identification information for the mobile device.

18. The non-transitory computer-readable storage media of claim 16, further comprising extending the second time period until the subsequent first time period.

19. The non-transitory computer-readable storage media of claim 16, wherein the operations further comprise ceasing broadcasting the advertising packet after a ranging session has commenced.

20. The non-transitory computer-readable storage media of claim 16, wherein the advertising packets for the one or more electronic devices include different preambles.

* * * * *